(12) United States Patent
Han et al.

(10) Patent No.: US 10,614,532 B1
(45) Date of Patent: Apr. 7, 2020

(54) INTERACTIVE ANALYTICS PLATFORM RESPONSIVE TO DATA INQUIRIES

(71) Applicant: OPOWER, INC., Arlington, VA (US)

(72) Inventors: Lawrence Han, Oakland, CA (US); Suryaveer Singh Lodha, Berkeley, CA (US); Daniel Bloomfield Ramagem, Derwood, MD (US); Michael Ian Kristopher Eaton, Redwood City, CA (US); Nowell Boardman Strite, Huntington, VT (US); Aaron Tsai Otani, San Mateo, CA (US); Khanh Duc Nguyen, Washington, DC (US)

(73) Assignee: OPOWER, INC., Arlington, VA (US)

( * ) Notice: Subject to any disclaimer, the term of this patent is extended or adjusted under 35 U.S.C. 154(b) by 1063 days.

(21) Appl. No.: 15/068,469

(22) Filed: Mar. 11, 2016

(51) Int. Cl.
*G06Q 50/06* (2012.01)
*G06Q 30/02* (2012.01)

(52) U.S. Cl.
CPC ......... *G06Q 50/06* (2013.01); *G06Q 30/0283* (2013.01)

(58) Field of Classification Search
CPC .. G06Q 50/06; G06Q 30/0206; G06Q 10/063; G06Q 10/06313; G06Q 10/06; G06Q 10/0631; G06Q 10/04; G06Q 10/06315; G06Q 30/018; G06Q 30/0283; G06Q 50/02; G06Q 30/0202; G06Q 30/04; G06Q 10/06312; G06Q 10/0635; G06Q 10/101; G06Q 10/20; G06Q 20/085;
(Continued)

(56) References Cited

U.S. PATENT DOCUMENTS

| 5,822,410 A | 10/1998 | McCausland |
| 6,141,758 A | 10/2000 | Benantar |

(Continued)

OTHER PUBLICATIONS

DeChambeau, B. (2014). Energy-efficiency retrofits in small-scale multifamily rental housing: A business model (Order No. 1558531). Available from ProQuest Dissertations and Theses Professional. (1554706479). Retrieved from http://dialog.proquest.com/professional/docview/1554706479?accountid=131444 (Year: 2014).*

(Continued)

*Primary Examiner* — Michael P Harrington
(74) *Attorney, Agent, or Firm* — Kraguljac Law Group, LLC

(57) ABSTRACT

Various aspects of the subject technology relate to systems, methods, and machine-readable media for an interactive analytics platform responsive to data inquiries. These aspects include identifying a request for energy consumption data of an energy user from a user in a live interaction with the energy user. A utility bill as well as energy consumption data associated with the second user may be retrieved using an authentication of the second user. Energy consumption factors that influence a billing amount of the utility bill may be identified based on the energy consumption data. An interface with specific billing insights that correspond to the energy consumption factors is generated. The specific billing insights provide an explanation as to why the billing amount of the utility bill exceeded a cost expectation of the second user. The interface mapped with the utility bill may be provided for display to the user.

20 Claims, 7 Drawing Sheets

(58) Field of Classification Search
CPC ...... G06Q 20/145; G06Q 40/02; G06Q 40/08;
G06Q 50/18; G06Q 50/26; G06Q 10/00;
G06Q 10/06314; G06Q 10/06375; G06Q
10/067; G06Q 10/109; G06Q 10/1093;
G06Q 10/1095; G06Q 20/102; G06Q
20/18; G06Q 20/3224; G06Q 20/389;
G06Q 30/0201; G06Q 30/0207; G06Q
30/0224; G06Q 30/0235; G06Q 30/0236;
G06Q 30/0246; G06Q 30/0247; G06Q
30/0269; G06Q 30/06; G06Q 40/04;
G06Q 40/06; G06Q 50/16; Y04S 50/14;
Y04S 50/12; Y04S 10/60
See application file for complete search history.

(56) References Cited

U.S. PATENT DOCUMENTS

| | | | |
|---|---|---|---|
| 6,366,889 B1* | 4/2002 | Zaloom | G06Q 10/04 705/7.37 |
| 7,487,223 B2 | 2/2009 | Kiyohara | |
| 7,789,499 B2 | 9/2010 | Iwanaga | |
| 7,873,485 B2 | 1/2011 | Castelli | |
| 8,255,274 B2 | 8/2012 | Pulak | |
| 8,660,813 B2* | 2/2014 | Curtis | G05B 15/02 700/299 |
| 8,805,724 B2 | 8/2014 | Itani | |
| 8,818,758 B1* | 8/2014 | Singh | G06F 21/81 702/182 |
| 8,983,670 B2 | 3/2015 | Shetty | |
| 9,448,719 B2 | 9/2016 | Havillio | |
| 9,590,930 B2 | 3/2017 | Karidi | |
| 9,612,286 B2 | 4/2017 | Gupta | |
| 9,722,972 B2 | 8/2017 | Ahmed | |
| 9,819,751 B2 | 11/2017 | Sugimura | |
| 2003/0009401 A1 | 1/2003 | Ellis | |
| 2003/0216971 A1* | 11/2003 | Sick | G01D 4/004 705/7.36 |
| 2006/0242405 A1* | 10/2006 | Gupta | H04L 63/0823 713/156 |
| 2007/0124253 A1* | 5/2007 | Angerame | G06Q 50/06 705/63 |
| 2007/0219860 A1 | 9/2007 | Karls | |
| 2008/0243593 A1 | 10/2008 | Ko | |
| 2008/0262928 A1 | 10/2008 | Michaelis | |
| 2008/0306985 A1* | 12/2008 | Murray | G06Q 10/10 |
| 2010/0082174 A1 | 4/2010 | Weaver | |
| 2011/0054993 A1 | 3/2011 | Marshall | |
| 2012/0209672 A1 | 8/2012 | Winner | |
| 2013/0013121 A1* | 1/2013 | Henze | G06Q 10/04 700/291 |
| 2013/0262211 A1 | 10/2013 | Tomlin, Jr. | |
| 2014/0074589 A1 | 3/2014 | Nielsen | |
| 2014/0129160 A1 | 5/2014 | Tran | |
| 2014/0277795 A1 | 9/2014 | Matsuoka | |
| 2015/0229699 A1 | 8/2015 | Liu | |
| 2016/0042368 A1 | 2/2016 | Sloss | |
| 2016/0078479 A1 | 3/2016 | Haugen | |

OTHER PUBLICATIONS

Barker, J. (Mar. 14, 2015). Energy efficiency savings not reaching low-income households. St. Louis Post—Dispatch Retrieved from http://dialog.proquest.com/professional/docview/1663347614?accountid=131444 (Year: 2015).*

Dastrup, S., McDonnell, S., & Reina, V. (2012). Household energy bills and subsidized housing. Cityscape, 14(1), 127-147. Retrieved from http://dialog.proquest.com/professional/docview/1009027724?accountid=131444 (Year: 2012).*

* cited by examiner

Home diagnosis

| | |
|---|---|
| Home type | Apartmet / Condo |
| Own or rent | Rent |
| Size | # beds or sqft |
| # of Occupants | 4 |
| Heating type | Air vents |
| Cooling type | Central AC |
| Water heater type | Gas |
| Lighting (efficient bulbs) | Less than half |
| Swimming Pool | Heated |
| Appliances | ☒ Washer ☐ Dryer ☒ Refrigeratr ☐ Dishwasher |

[Calculate]

$136

☐ Heating — $136
☐ Hot Water — $85
☐ Appliances — $44
☐ Electronics — $35
☐ Lighting — $27
☐ Base Usage — $12

Energy saving tips

By type: [Heating] [Cooling] [Hot water] [Lighting] [Appliances]

By Season: [Summer] [Winter]

Adjust your thermostat a few degrees

Why? Setting your thermostat for energy savings can decrease your cooling and heating bills significantly

CSR Follow-ups

Select communications to enroll customer in:

- ☒ Unusual Usage Alerts
- ☐ Weekly AMI Emails
- ☐ Bill Ready Notification *currently enrolled Customer email address

[Sign Up]

Was this call successfully resolved?

[Yes] [No]

FIG. 5

INTERACTIVE ANALYTICS PLATFORM RESPONSIVE TO DATA INQUIRIES

BACKGROUND

Field

The present disclosure generally relates to computer-based data analytics, and more particularly to an interactive analytics platform responsive to data inquiries.

Description of the Related Art

Energy users typically do not have knowledge of how much energy has been consumed and/or how large a utility bill is expected to grow until the energy user receives a utility bill. Utility call centers use common energy usage analysis tools to respond to utility bill inquiries. However, the common energy usage analysis tools provide table-based views of energy usage data that a user of such tools must comb through, thus requiring the user to utilize additional tools to extract insightful information from such data. In this respect, the common energy usage analysis tools are limited in their capability to correlate the energy usage data to underlying trends, such as changes in weather, thereby requiring users to manually create their own insights by looking at an energy user's raw energy data.

SUMMARY

According to one embodiment of the present disclosure, a computer-implemented method is provided for receiving user input from a first user associated with a utility service provider, the user input identifying a request for energy consumption data, the energy consumption data identifying one or more energy usage patterns associated with a second user; retrieving a utility bill associated with the second user in response to the received user input; retrieving the energy consumption data associated with the utility bill from one or more distributed computing devices; identifying one or more energy consumption factors influencing a billing amount of the utility bill based on the energy consumption data; generating an interface comprising a plurality of insights that correspond to the one or more energy consumption factors, the plurality of insights identifying one or more explanations as to why the billing amount of the utility bill exceeded a cost expectation of the second user; mapping at least a portion of the utility bill to the interface; and providing the interface for display, the plurality of insights being displayed based on one or more interactions between the first user and the interface.

In certain aspects, the method further includes identifying first usage data and second usage data from the retrieved energy consumption, the first usage data corresponding to a first billing cycle and the second usage data corresponding to a second billing cycle; comparing the first usage data to the second usage data; identifying a usage difference between the first usage data and the second usage data based on comparison results from the comparison; and providing an indication of the usage difference as one of the plurality of insights. In these aspects, the method further includes retrieving energy consumption data associated with other users of similar characteristics to the second user, obtaining first usage data from the energy consumption data associated with the second user; obtaining second usage data from the energy consumption data associated with the other users, the first usage data and the second usage data corresponding to a same time period; determining a first usage trend from the first usage data and a second usage trend from the second usage data, the first usage trend and the second usage trend being determined using two or more billing cycles of the same time period; comparing the first usage trend to the second usage trend; identifying a trend difference between the first usage trend and the second usage trend based on comparison results from the comparison, the trend difference identifying an increase or decrease in energy consumption by the second user relative to the other users over the two or more billing cycles; and providing an indication of the trend difference as one of the plurality of insights.

In these aspects, the method further includes processing the energy consumption data using at least one of the plurality of insights; determining one or more proposed changes to the energy consumption data for a projected billing cycle, the one or more proposed changes corresponding to a decreasing rate of energy consumption for a property associated with the second user; generating a notification identifying a recommendation to the second user on how to adopt the one or more proposed changes; and providing the generated notification for display within the interface. In these aspects, the method further includes identifying a first rate value associated with the energy consumption data; identifying a second rate value different than the first rate value, the second rate value being proposed to the second user; comparing the first rate value to the second rate value; identifying a rate difference between the first rate value and the second rate value based on comparison results from the comparison, the rate difference corresponding to a billing amount difference in the utility bill of the second user; and providing an indication of the rate difference as one of the plurality of insights. In these aspects, the method further includes obtaining weather data from a weather service provider; identifying one or more weather patterns from the weather data, each of the one or more weather patterns corresponding to a different calendar cycle; generating an energy consumption model based on at least one of the one or more weather patterns corresponding to a billing cycle of the utility bill; applying the energy consumption model to the energy consumption data; determining a correlation between the energy consumption model and the energy consumption data, the correlation identifying at least a portion of the energy consumption data being influenced by the at least one of the weather patterns; generating an indication of one or more units of time in the billing cycle of the utility bill corresponding to the correlation between the at least one of the weather patterns and the energy consumption data; and providing the generated indication as one of the plurality of insights. In these aspects, the method further includes disaggregating the energy consumption data to determine a number of cooling degree days and a number of heating degree days corresponding to a billing cycle of the utility bill, the number of cooling degree days and the number of heating degree days being associated with the at least one of the one or more weather patterns; and determining cooling coefficients associated with the number of cooling degree days, and heating coefficients associated with the heating degree days based on one or more characteristics of a property associated with the second user, the energy consumption model being generated using the cooling coefficients and the heating coefficients.

In these aspects, the method further includes receiving first user input identifying one or more characteristics of a property associated with the second user; receiving second user input identifying a type of climate control associated with the property; identifying one or more setting changes to a setpoint schedule associated with the type of climate control; determining a projected utility bill corresponding to a projected billing cycle, the projected utility bill identifying a difference in billing amount between the utility bill and the projected utility bill based on the one or more setting changes to the setpoint schedule; and providing an indication of the projected utility bill for display within the user interface. In these aspects, the method further includes providing an indication of the one or more setting changes to the setpoint schedule for display within the interface based on one or more interactions between the first user and a representation of the projected utility bill provided for display on the interface. In these aspects, the method further includes providing an interactive energy consumption histogram associated with a billing cycle of the utility bill for display within the interface, the interactive energy consumption histogram identifying a distribution of energy consumption over a plurality of time units of the billing cycle; receiving user input identifying a location on the displayed interactive energy consumption histogram, the location corresponding to at least one of the plurality of time units; generating a preview window that includes an indication of at least one of the plurality of insights corresponding to energy consumption on the at least one of the plurality of time units; and providing the preview window for display in an overlay at a position overlapping at least in part the location on the interactive energy consumption histogram. In these aspects, the user input includes a cursor corresponding to the location on the interactive energy consumption histogram, wherein the cursor is hovered over the location on the interactive energy consumption histogram to trigger the display of the preview window. In these aspects, the user input also includes a touch input corresponding to the location on the interactive energy consumption histogram, wherein the touch input is detected on a display unit for a predetermined duration of time to trigger the display of the preview window.

In these aspects, the method further includes receiving a first user input identifying a request for a usage histogram corresponding to a billing cycle of the utility bill; receiving a second user input identifying a request for a weather histogram corresponding to the billing cycle; associating at least a portion of the weather histogram with the usage histogram; determining a first mapping between the weather histogram and the utility bill, and a second mapping between the usage histogram and the utility bill based on the association between the weather histogram and the usage histogram; comparing the first mapping to the second mapping; determining a correlation between the utility bill and one of the usage histogram or the weather histogram based on comparison results from the comparison, the correlation identifying energy consumption or weather as a primary source for the billing amount of the utility bill to exceed the cost expectation of the second user; and providing an indication of the correlation as one of the plurality of insights. In these aspects, the method further includes disaggregating the energy consumption data into a plurality of energy consumption components, each of the plurality of energy consumption components corresponding to a different type of energy demand associated with one or more components of a property; providing a representation of the plurality of energy consumption components for display within the interface; mapping a rate value to each of the plurality of energy consumption components to determine respective utility costs; and providing a prioritized listing of the respective utility costs for display within the interface based on one or more interactions between the first user and the representation of the plurality of energy consumption components.

In these aspects, the method further includes obtaining first weather data corresponding to a first time period, and second weather data corresponding to a second time period, the second time period being different than the first time period; determining a first temperature from the first weather data and a second temperature from the second weather data; comparing the first temperature to the second temperature to determine a weather comparison between the first time period and the second time period; and providing an indication of the weather comparison as one of the plurality of insights. In these aspects, the method further includes obtaining historical energy consumption data associated with a property of the second user, the historical energy consumption data comprising energy consumption data corresponding to a plurality of billing cycles, each of the plurality of billing cycles including a plurality of weekly intervals, each of the plurality of weekly intervals including a plurality of daily intervals, each of the plurality of daily intervals including a plurality of hourly intervals; identifying at least one of the plurality of hourly intervals as a highest hourly interval, the highest hourly interval corresponding to a highest energy consumption among the plurality of hourly intervals for each of the plurality of daily intervals; identifying at least one of the plurality of daily intervals as a highest daily interval, the highest daily interval corresponding to a highest energy consumption among the plurality of daily intervals for each of the plurality of weekly intervals; and providing an indication of the highest hourly interval and the highest daily interval as respective insights of the plurality of insights. In these aspects, the method further includes applying a rate value to energy consumption data corresponding to at least the highest daily interval to determine a billing amount associated with the highest daily interval; and providing the billing amount associated with the highest daily interval for display within the interface based on one or more interactions between the first user and the indication of the highest daily interval. In these aspects, the method further includes determining a type of inquiry from the second user based on a location of each of one or more interactions between the first user and the interface, each of the locations corresponding to respective portions of the utility bill of interest to the second user for identifying additional information associated with the plurality of insights.

According to one embodiment of the present disclosure, a system is provided including one or more processors and a computer-readable storage medium coupled to the one or more processors, the computer-readable storage medium including instructions that, when executed by the one or more processors, cause the one or more processors to provide an interface configured to display a plurality of portions of a utility bill from a utility service provider, the interface being provided for display on a client device associated with a first user, the first user being associated with the utility service provider; receive user input from the first user, the user input identifying a request for energy consumption data associated with a second user, the energy consumption data identifying an amount of energy consumption of a property associated with the second user over a predetermined billing cycle; retrieve a utility bill associated with the second user in response to the received user input, the utility bill identifying a billing amount of the energy consumption data in the predetermined billing cycle; retrieve the energy consumption data associated with the utility bill from one or more distributed computing devices, the utility bill and the energy consumption data being retrieved based on the first user masquerading as the second user using a security token from an authentication associated with the second user; identify one or more energy consumption factors influencing the billing amount of the utility bill based on the energy consumption data; generate an interface comprising insight information that corresponds to the one or more energy consumption factors, the insight information identifying one or more explanations as to why the billing amount of the utility bill exceeded a cost expectation of the second user; map at least a portion of the utility bill to the interface; and provide the interface for display, the insight information being displayed based on one or more interactions between the user and the interface.

According to one embodiment of the present disclosure, a non-transitory computer readable storage medium is provided including instructions that, when executed by a processor, cause the processor to receive user input from a first user associated with a utility service provider, the user input identifying a request for energy consumption data associated with a second user, the energy consumption data identifying an amount of energy consumption of a property associated with the second user; authenticate the second user using security credentials associated with the second user, the security credentials being provided on a client device associated with the first user; identify a session identifier associated with the authentication of the second user, the session identifier comprising an indication of the second user being authenticated; retrieve a utility bill associated with the second user based on a security token associated with the session identifier; retrieve the energy consumption data associated with the utility bill from one or more distributed computing devices using the security token; identify one or more energy consumption factors influencing a billing amount of the utility bill based on the energy consumption data; generate an interface comprising insight information that corresponds to the one or more energy consumption factors, the insight information identifying one or more explanations as to why the billing amount of the utility bill exceeded a cost expectation of the second user; map at least a portion of the utility bill to the interface; and provide the interface for display, the insight information being displayed based on one or more interactions between the user and the interface.

According to one embodiment of the present disclosure, a system is provided for providing user-specific billing insights as responsive to a utility data inquiry from a user. The system includes means for receiving user input from a first user associated with a utility service provider, the user input identifying a request for energy consumption data, the energy consumption data identifying one or more energy usage patterns associated with a second user; retrieving a utility bill associated with the second user in response to the received user input; means for retrieving the energy consumption data associated with the utility bill from one or more distributed computing devices; means for identifying one or more energy consumption factors influencing a billing amount of the utility bill based on the energy consumption data; means for generating an interface comprising a plurality of insights that correspond to the one or more energy consumption factors, the plurality of insights identifying one or more explanations as to why the billing amount of the utility bill exceeded a cost expectation of the second user; means for mapping at least a portion of the utility bill to the interface; and means for providing the interface for display, the insight information being displayed based on one or more interactions between the first user and the interface.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the images and detailed description are to be regarded as illustrative in nature and not as restrictive.

BRIEF DESCRIPTION OF THE IMAGES

The accompanying images, which are included to provide further understanding and are incorporated in and constitute a part of this specification, illustrate disclosed embodiments and together with the description serve to explain the principles of the disclosed embodiments. In the images:

FIG. 5 illustrates an example of an additional section of the interface with specific billing insights of FIG. 4.

DETAILED DESCRIPTION

Figure 1:
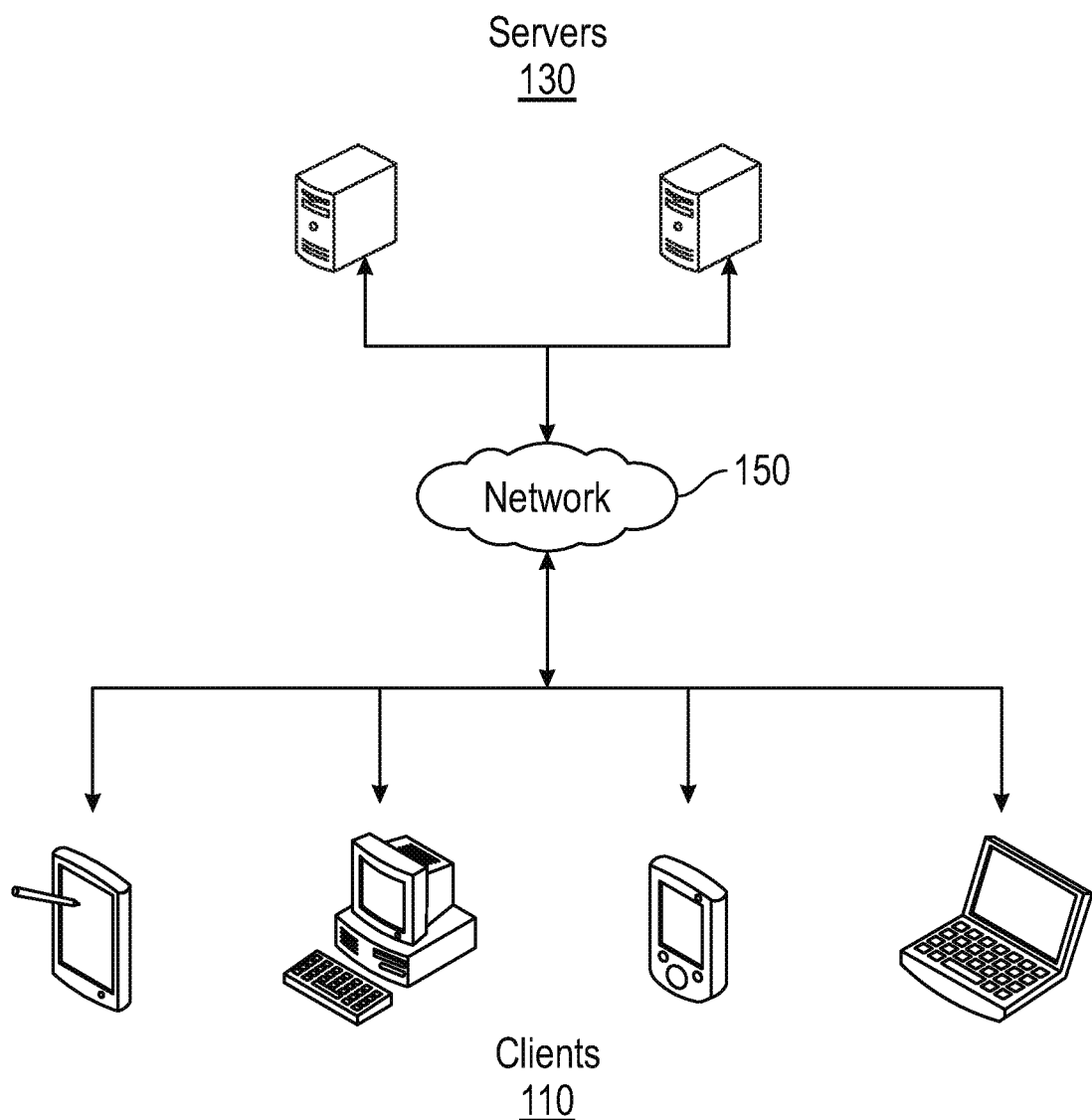
FIG. 1 illustrates an example architecture for providing specific utility billing insight data suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

There is a problem with current energy consumption auditing engines in that users, intending to search for utility billing insights relating to an energy user's utility bill, submit a request for energy consumption data of that user but receive disjointed energy data results, thereby requiring the users to manually formulate their own insights by reviewing the energy user's raw energy data.

The disclosed system addresses this problem specifically arising in the realm of computer technology by providing a solution also rooted in computer technology, namely, by running big data applications of a distributed computing framework to combine, process, and analyze raw energy usage data, such as utility meter data, and any related climate control information (e.g., weather, property characteristics) to produce specific utility billing insight data that is intended to respond to energy user billing inquiries. In certain aspects, the distributed computing framework is operated on one or more servers (or clusters of servers) and accesses large amounts of raw energy usage data stored in memory of the servers or stored elsewhere and accessible by the servers in order to perform scalable batch processing and/or accesses information of a particular energy sensor device. Next, after the distributed computing framework has analyzed the large amounts of data on a time-series basis, the analyzed raw energy usage data may be provided to an interface for providing data summarization, query and analysis. Thus, when a user (e.g., a customer service representative of a utility service provider) using a client device, running an application to access the interface, searches for energy consumption data of a particular energy user, the interface can summarize energy consumption over a particular time period of the energy user as well as enable the user to query for specific insights that provide reasons for the utility bill exceeding a cost expectation of the energy user. In other aspects, the user of the client device that accesses the interface may also be the particular energy user.

The proposed solution further provides improvements to the functioning of the computer itself because it reduces network usage. Specifically, the computer hosting the analyzed raw energy usage data is not required to frequently transfer over a network with the distributed computing framework because the distributed computing framework is configured to handle sequential input/output data streams for large amounts of time-series data and analytic processing, thereby yielding scalable batch processing of utility meter data output at varying reporting rates.

Although many examples provided herein describe a user's utility account information being identifiable, or identity information being stored, each user must grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

As used herein, the term "usage" described herein refers to a quantity of use, a cost associated with the use, or a quantified metric representing the use or cost. The term "raw energy usage" described herein refers to a meter reading or a usage reading from a utility meter device. The term "commodity" described herein refers to a utility-based commodity, such as electricity, water, and natural gas, which are consumable finite resources delivered to a dwelling or a commercial structure. The term "component of a property" described herein refers to a component associated with the property that is able to consume a commodity. One example of a component of a property may be a heating, ventilation and air conditioning (HVAC) system that controls the climate within the property using electricity, natural gas, and/or another commodity. The term "property" may be interchangeably used with the term "structure" or "premises" in the disclosure herein. The component may relate to one or more of a central heating device, a central air conditioning and heating system, an appliance, an electronic device, water heating system, a power generating device, a ventilation system, or an air filtration system. The term "climate control device" as used herein refers to one or more of a thermostat, an application running on a computing device, or a computing device coupled to the thermostat depending on implementation. The terms "billing cycle" and "billing period" are interchangeably used in the disclosure herein.

FIG. 1 illustrates an example architecture 100 for providing specific utility billing insight data identified as responsive to a search query from a user for energy consumption data of a particular energy user based on a number of factors identified as influential to the rate of energy consumption by the particular energy user. The architecture 100 includes servers 130 and clients 110 connected over a network 150.

One of the many servers 130 is configured to host a computer-operated distributed framework. The distributed computing framework is designed to process time-series energy consumption data received from residential and/or commercial utility meter devices. One of the many servers 130 also hosts a collection of raw energy usage data. The collection of raw energy usage data can be searched using a billing advisor engine and/or a data browser engine (e.g., accessible through a web page on one of the clients 110). Raw energy usage data from the collection can be processed and segmented by the distributed computing framework to identify features of the raw energy data are likely to indicate reasons for respective changes in the energy consumption data for an energy user (or a cluster of energy users) over a given time period. The servers 130 can return an interface with specific utility billing insights mapped to respective portions of a utility bill to the clients 110 in response to a search query from a user in a real-time interaction with a subject energy user. For purposes of load balancing, multiple servers 130 can host the distributed computing framework and multiple servers 130 can host the collection of raw energy usage data.

The servers 130 can be any device having an appropriate processor, memory, and communications capability for hosting the distributed computing framework, the collection of raw energy usage data, the billing advisor engine and the data browser engine. The billing advisor engine and the data browser engine is each accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the billing advisor engine and the data browser engine on at least one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
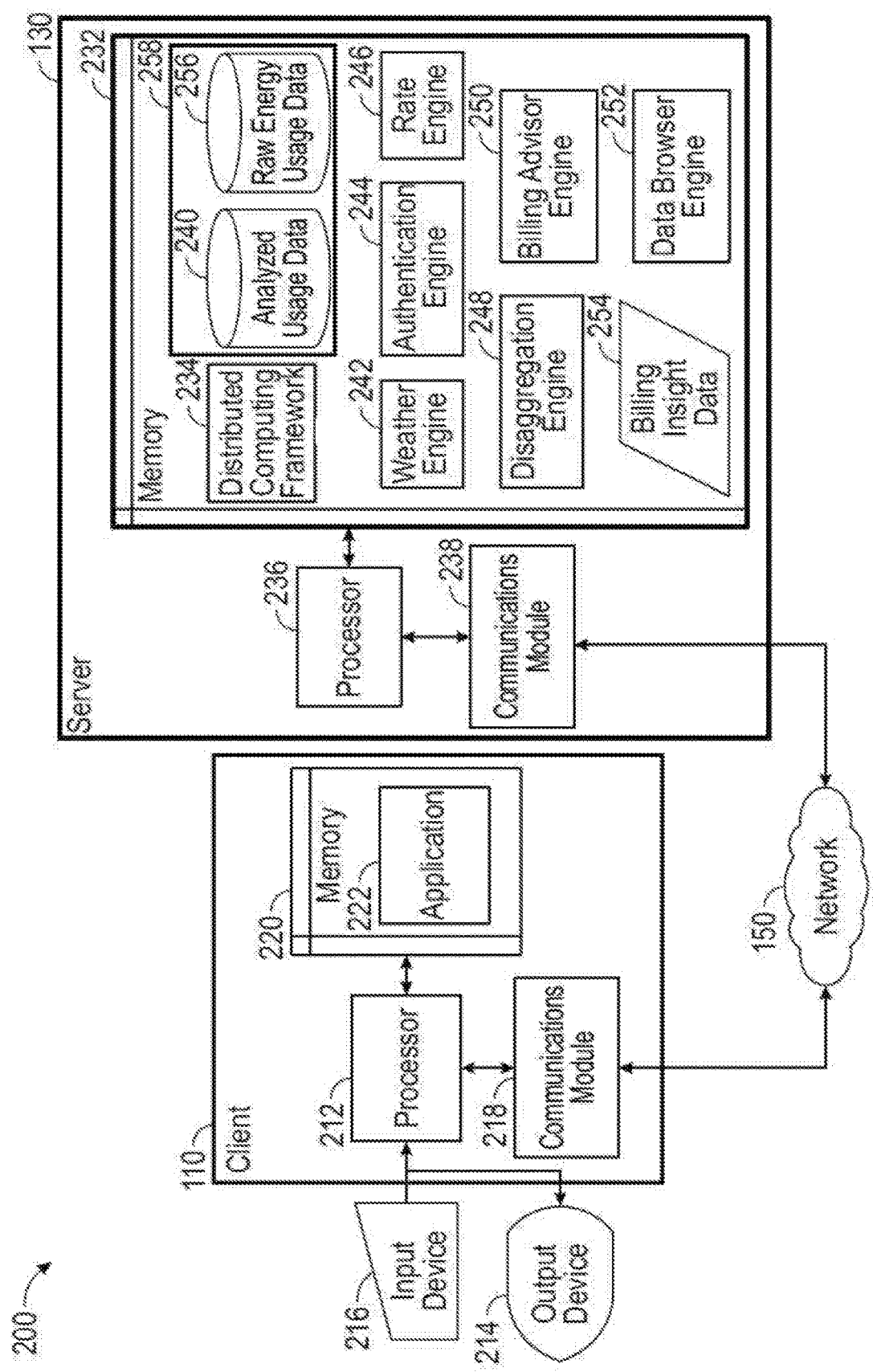
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232. The memory 232 of the server 130 includes a distributed computing framework 234 and a collection of energy usage data 258. The collection of energy usage data 258 includes analyzed usage data 240 and raw energy usage data 256. In some aspects, the collection of energy usage data 258 may include detailed billing data obtained from one or more data sources accessible to the server 130. In other aspects, the collection of energy usage data 258 may include multiple types of energy usage data and/or multiple types of billing data obtained from one or more utility service providers accessible to the server 130. As discussed herein, the distributed computing framework 234 is a type of distributed computing where big data sets at terabyte or petabyte scale are processed offline in parallel. The architecture of the distributed computing framework 234 may be in the style of existing well-known distributed processing architectures such as Hadoop, MapReduce, or other parallel processing models. In certain aspects, the distributed computing framework 234 consists of a stack of software layers (e.g., non-relational distributed database, object-relational mapping and persistence framework) followed by several application layers, such as an interface layer (e.g., data warehousing infrastructure) to set up distributed file tables so that the distributed computing framework 234 organizes and stores analyzed raw energy usage data into corresponding locations in the collection of energy usage data 258.

The memory 232 also includes a weather engine 242, an authentication engine 244, a rate engine 246, and a disaggregation engine 248. The weather engine 242 is configured to process weather data obtained from one or more weather data sources and/or third-party weather data centers (e.g., National Weather Service, National Centers for Environmental Information, etc.), and determine weather patterns over a given time period. In some aspects, the weather engine 242 is configured to map the weather data to one or more datasets relating to energy consumption data of a particular energy user. In this respect, the weather engine 242 identifies one or more sections of the energy consumption data likely influenced by the weather patterns corresponding to the given time period. In some aspects, the weather engine 242 includes one or more weather forecast models to extrapolate one or more datasets in the energy consumption data based on forecasted weather patterns of a given time period. In this respect, the weather engine 242 may access and/or retrieve historical weather data including corresponding geographical data. In some aspects, the weather engine 242 determines degree day measurements over a predetermined time period for a particular geographic region. The weather engine 242 may determine heating degree days (HDDs) and cooling degree days (CDDs) for structures residing within the particular geographic region. The HDDs are indicators of residential or commercial energy consumption for space heating (e.g., the amount of heating required for a residential structure). Similarly, the CDDs are indicators of the amount of cooling required for residential or commercial structures. The weather engine 242 may measure the HDDs and/or CDDs by reference to a predetermined base temperature (e.g., 65° F. in many cases).

The authentication engine 244 performs authentication of an energy user to obtain access to user information associated with the energy user. Authentication procedures typically use web-based protocols (e.g., OAuth 2.0, OpenID, SAML). A client application starts an authentication flow to a core service by masquerading as a particular energy user to obtain an authentication token for the particular energy user, and as part of the masquerade specify a lookup in an authentication server. In this respect, the server 130 may be communicably coupled to the authentication server. The authentication server authenticates the user, and provides a response message including the requested authentication token. In some aspects, the requested authentication token is provided as, or at least in part as, a session identifier associated with the masquerade. After the authentication server has generated the token and included the token in a response via a cookie to the client 110, the client application can use the authentication token to make a web service request to an API endpoint (e.g., web service, core service) that in return provides energy consumption data including utility bill information of the energy user. In an aspect, the authorization server supports JavaScript applications (e.g., JavaScript running in a web browser). In response to a request, the authorization server issues an authentication token given the type of the application (i.e., JavaScript). The client can validate the received token, and thereafter include the authentication token in an endpoint API request.

The rate engine 246 may store a local copy of a rate schedule associated with fees for commodities provided by the utility service provider. The rate engine 246 may be configured to obtain the rate schedule, associated with a given billing period, from the utility service provider. In some aspects, the rate engine 246 is configured to determine rate differences between two billing periods and/or calendar periods. In some aspects, the rate schedule identifies a listing of tiers corresponding to respective rates, where each tier corresponds to a different threshold of energy consumption.

The disaggregation engine 248 is configured to parse an aggregated energy signal, such as the raw energy usage data, to determine individual energy signals corresponding to energy consumption by specific appliances (e.g., refrigerator, oven element, stove burner, water heater, etc.) and/or types of energy loads (e.g., gas, electricity) of residential and/or commercial structures. The disaggregation engine 248 may utilize one or more disaggregation algorithms to obtain and process the aggregated energy signals from a sensor device (e.g., smart meter, plug level monitors, etc.). The disaggregation engine 248 may interface with the sensor device and retrieve measurement data from the sensor device on a predetermined interval of time (e.g., hourly, daily, weekly, monthly). The disaggregation algorithms may detect steady state transitions and/or harmonics over time, which correspond to different types of loads consuming energy during the measurement period. In some aspects, the disaggregation engine 248 processes raw energy usage data sampled at a frequency in a range of about 10 Hertz (Hz) to about 1 MHz. The disaggregation engine 248 processes raw energy usage data sampled at a frequency in a range of about 1 second to about 1 minute in some embodiments, or at a frequency greater than 1 MHz in other embodiments. The data output from the disaggregation engine 248 may be used for segmentation by energy user and/or utility service provider, and the segmentation data can facilitate energy efficient marketing techniques, such as generating promotional content targeted for particular energy users.

The memory 232 also includes a billing advisor engine 250 and a data browser engine 252 for searching the collection of energy usage data 258. The billing advisor engine 250 is configured to analyze a utility bill of an energy user to determine one or more areas of the utility bill that require explanation to the energy user. The billing advisor engine 250 obtains data from the raw energy usage data 256 for analysis, and determines multiple scenarios relating to a given utility bill from the analyzed energy data. For example, the billing advisor engine 250 may provide utility bill comparisons between two billing cycles (e.g., monthly cycles, corresponding cycle of a previous year) in terms of usage (e.g., unit of energy such as kilowatt hour) or cost (e.g., price difference). In one example, the billing advisor engine 250 may utilize weather data from the weather engine 242 to identify weather as a cause for a difference in cost between two utility bills of consecutive billing cycles.

The billing advisor engine 250 may utilize the weather data from the weather engine 242 to identify an average outdoor temperature over a given time period (or billing cycle). In this respect, temperature differences between two billing cycles may be provided as part of the billing analysis by the billing advisor engine 250. In some aspects, the billing advisor engine 250 analyzes the weather data from the weather engine 242 to identify how many HDDs and/or CDDs are measured in a given billing cycle to indicate respectively the amount of heating or the amount of cooling that was needed in the given billing cycle. In some aspects, the billing advisor engine 250 may utilize the HDD/CDD data to respectively identify heating and/or cooling coefficients. In these aspects, the billing advisor engine 250 may determine whether a structure associated with the energy user is susceptible to certain weather patterns, thereby causing certain fluctuations in the billing amount of one or more billing cycles.

In one or more implementations, the billing advisor engine 250 obtains data identifying census, parcel and/or permit data associated with a target population of energy users. Additionally, the billing advisor engine 250 obtains data identifying home size, occupancy, age, heating type, weather patterns, and other factors to group households (or clusters of energy users) to compare their energy usage data to each other. In this respect, the billing advisor engine 250 can provide utility bill comparisons between a subject energy user and neighboring energy users (or energy users of similar characteristics to the subject energy user). For example, the billing advisor engine 250 may determine whether the energy consumption of the subject energy user increased or decreased relative to the neighboring energy users. In some aspects, the neighboring energy users reside in a common geographical area, such as a neighborhood, as the subject energy user. In other aspects, the neighboring energy users reside in different geographical areas but reside in structures of similar characteristics as that of the subject energy user.

The billing advisor engine 250 may provide bill comparisons based on bill length (e.g., number of days in billing cycle). For example, the billing advisor engine 250 may analyze utility bills corresponding to different billing cycles, and determine the billing amount difference due to bill length. In some aspects, the billing advisor engine 250 may identify a difference in the number of days between the billing cycles, and identify the difference as a possible cause for a cost increase or cost decrease in the utility bill.

In some implementations, the billing advisor engine 250 provides bill comparisons due to changes in energy consumption. For example, the billing advisor engine 250 may compare two utility bills of respective billing cycles, and determine that changes in the cost from one billing cycle to the next is due to changes in the amount of energy consumption. In some aspects, the billing advisor engine 250 identifies which day of a given week in a given billing cycle had the highest energy consumption. Similarly, the billing advisor engine 250 may determine on average which day of the week in a given billing cycle has a tendency to correspond to the highest energy consumption. In one or more implementations, the billing advisor engine 250 determines which hours in a given day had the highest energy consumption. In this respect, the billing advisor engine 250 may analyze data from the raw energy usage data 256 that is measured from smart meters configured to sample at sub-daily sampling rates.

In one or more embodiments, the billing advisor engine 250 determines a forecasted bill amount for a projected billing cycle. In this respect, the billing advisor engine 250 may extrapolate one or more data points in energy usage data of the projected billing cycle based on energy usage data corresponding to a previous billing cycle and/or an average of billing amounts from a set of billing cycles corresponding to the projected billing cycle. In some aspects, the billing advisor engine 250 the billing advisor engine 250 may determine one or more setpoint settings of a setpoint schedule associated with an energy user based on energy usage patterns from raw energy usage data corresponding to the energy user. In this respect, the billing advisor engine 250 may determine candidate setpoint settings to alter a billing amount of a projected utility bill. In other aspects, the billing advisor engine 250 may determine an energy load curve shape associated with the energy consumption data of an energy user. In this respect, the billing advisor engine 250 may identify respective sections of the energy load curve shape, and map the sections to respective types of loads (e.g., oven element, refrigerator, etc.) for identifying the source of energy consumption. In some examples, the energy load curve shape is a two-dimensional histogram identifying the amount of energy consumption (e.g., kilowatt hour(s)) over time (e.g., seconds, minute(s), hour(s), etc.).

The data browser engine 252 allows navigation through the raw energy usage data 256 and/or the analyzed usage data 240. For example, the data browser engine 252 may pull additional energy usage information relating to data provided by the billing advisor engine 250. The data browser engine 252 may index the analyzed usage data 240 by a predetermined interval of time (e.g., daily, sub-daily) to provide additional insight into the energy consumption of an energy usage over the course of a day or over a week or other given observation period. For example, the data browser engine 252 may allow toggling between billing cycles in daily cost views of the navigated energy usage data. In some aspects, the analyzed usage data 240 refers to data that has been processed based on the raw energy usage data 256. For example, the analyzed usage data 240 may include data processed by the processor 236 and/or the billing advisor engine 250 to include usage data mapped to corresponding rate information for identifying one or more billing data items.

The memory 232 also includes billing insight data 254. The billing insight data 254 includes a collection of the insight data output from the billing advisor engine 250. The billing insight data 254 may be used to explain possible causes for the billing amount of an inquired utility bill to exceed a cost expectation of the subject energy user. The billing insight data 254 includes insight data relating to the bill amount, weather, bill length, consumption, rates, neighborhood comparison, bill forecast, setpoint schedule settings, energy load curve, heating/cooling coefficients, and other energy related information used to decipher the billing amount.

Although the billing insight data 254 is illustrated as being separate from the collection of energy usage data 258, in certain aspects the billing insight data 254 is a subset of the collection of energy usage data 258. Furthermore, although the collection of energy usage data 258 and the billing advisor engine 250 are illustrated as being in the same memory 232 of a server 130 as the distributed computing framework 234, in certain aspects the collection of energy usage data 258 and the billing advisor engine 250 can be hosted in a memory of a different server but accessible by the server 130 illustrated in FIG. 2.

The processor 236 of the server 130 is configured to execute instructions, such as instructions physically coded into the processor 236, instructions received from software in memory 232, or a combination of both. For example, the processor 236 of the server 130 executes instructions to provide an interface configured to display one or more portions of a utility bill from a utility service provider. In one or more aspects, the interface is provided to a display device on the client 110 for display. The client 110 may be operated by a first user associated with the utility service provider (e.g., customer service representative).

In certain aspects, the processor 236 of the server 130 is configured to receive user input from the client 110. The user input is received by, for example, the first user accessing the billing advisor engine 250 over the network 150 using an application 222 in memory 220 on the client 110 of the first user, and the first user submitting the user input using an input device 216 of the client 110. For example, the first user may use the input device 216 to submit a request identifying a search query for energy consumption data of an energy user. In response to the user input, a processor of the client 110 is configured to transmit the search query over the network 150 using the communications module 218 of the client 110 to the communications module 238 of the server 130.

The user input may identify a request for energy consumption data associated with a second user (e.g., the energy user). The processor 236 of the server 130 may retrieve a utility bill associated with the second user in response to the received user input. In some aspects, the utility bill is retrieved directly from the utility service provider (not shown) over the network 150. The utility bill may identify a billing amount of the energy consumption data in the predetermined billing cycle. The processor 236, using the billing advisor engine 250, may retrieve the energy consumption data associated with the utility bill from one or more distributed computing devices associated with the utility service provider. The retrieved energy consumption data may be stored in the raw energy usage data 256 for processing. The utility bill and the energy consumption data may be retrieved based on the first user masquerading as the second user using a security token from an authentication associated with the second user. In this example, the processor 236, via the authentication engine 244, can authenticate the first user using security credentials of the second user. As discussed above, the second user must grant explicit permission for such user information to be shared with the first user. The processor 236, using the billing advisor engine 250, may identify one or more energy consumption factors influencing the billing amount of the utility bill based on the energy consumption data. In this example, energy consumption factors may relate to the bill amount, weather, bill length, rates, and consumption rates that factor into the calculation of the bill amount. In turn, the processor, using the billing advisor engine 250 and the billing insight data 254, may generate an interface having insight information that corresponds to the one or more energy consumption factors. As discussed above, the insight information may identify one or more explanations as to why the billing amount of the utility bill exceeded a cost expectation of the second user. The processor 236 may map at least a portion of the utility bill to the interface so that items of the utility bill can correspond to the identified billing amount explanations. The processor 236 may then provide the interface to the application 222 on the client 110 over the network 150 for display by an output device 214 of the client 110. In some aspects, the insight information is displayed on the client 110 based on one or more interactions between the first user and the interface. For example, the first user may hover over a location on the interface, and insight data corresponding to the location may be triggered to be displayed in an overlay at a position that overlaps the location.

In certain aspects, the processor 236, using the billing advisor engine 250, identifies first usage data and second usage data from the retrieved energy consumption (e.g., the raw energy usage data 256). The first usage data may correspond to a first billing cycle and the second usage data may correspond to a second billing cycle (e.g., a billing cycle previous to the first billing cycle). The processor 236 may compare the first usage data to the second usage data, and identify a usage difference between the first usage data and the second usage data based on comparison results from the comparison. In turn, the processor 236, using the billing advisor engine 250, can provide an indication of the usage difference as insight data. In this respect, the insight data relating to the usage difference may be stored as part of the billing insight data 254.

In certain aspects, the processor 236, using the billing advisor engine 250, retrieves energy consumption data associated with other users of similar characteristics to the second user (e.g., neighboring energy users). The processor 236 can obtain first usage data from the energy consumption data associated with the second user, and obtain second usage data from the energy consumption data associated with the other users. The first usage data and the second usage data may correspond to a same time period (e.g., same billing cycle). The processor 236 may determine a first usage trend from the first usage data and a second usage trend from the second usage data. The first usage trend and the second usage trend may be determined using two or more billing cycles of the same time period (e.g., consecutive months over a six-month period). The processor 236 may then compare the first usage trend to the second usage trend, and identify a trend difference between the first usage trend and the second usage trend based on comparison results from the comparison. The trend difference may identify an increase or decrease in energy consumption by the second user relative to the other users over the two or more billing cycles. For example, the first usage trend may be trending upward relative to the second usage trend, indicating an increase in energy consumption in the first usage trend. The processor 236 may provide an indication of the trend difference as insight data. In this respect, the insight data relating to the trend difference may be stored as part of the billing insight data 254.

In certain aspects, the processor 236, using the billing advisor engine 250, is configured to process the energy consumption data using data from the billing insight data 254 as guidance. The processor 236 may determine one or more proposed changes to the energy consumption data for a projected billing cycle. In these aspects, the one or more proposed changes may correspond to a decreasing rate of energy consumption for a property associated with the second user. The processor 236 may generate a notification (e.g., a real-time display notification, follow-up communication) identifying a recommendation to the second user on how to adopt the one or more proposed changes. The processor 236 may provide the generated notification for display within the interface as part of a real-time response to a utility bill inquiry.

In certain aspects, the processor 236, using the rate engine 246, identifies a first rate value associated with the energy consumption data, and identifies a second rate value different than the first rate value, where the second rate value may be proposed to the second user. The first rate value and the second rate value may correspond to a same rate schedule in some embodiments, or correspond to different rate schedules in other embodiments. The processor 236 may compare the first rate value to the second rate value, and identify a rate difference between the first rate value and the second rate value based on comparison results from the comparison. In some aspects, the rate difference corresponds to a billing amount difference in the utility bill of the second user. The processor 236, using the billing advisor engine 250, may provide an indication of the rate difference as insight data. In this respect, the insight data relating to the rate difference may be stored as part of the billing insight data 254.

In certain aspects, the processor 236, using the weather engine 242, obtains the weather data from one or more weather data sources and/or third-party weather data centers (e.g., a weather service provider). In other aspects, the weather engine 242 obtains multiple types of weather data from the one or more weather data sources accessible to the server 130. The processor 236 may identify one or more weather patterns from the weather data, where each of the one or more weather patterns may correspond to a different calendar cycle or billing cycle. The processor 236, using the billing advisor engine 250, may generate an energy consumption model based on at least one of the one or more weather patterns corresponding to a billing cycle of the inquired utility bill. The processor 236 may apply the energy consumption model to the energy consumption data, and determine a correlation between the energy consumption model and the energy consumption data. In these aspects, the correlation may identify at least a portion of the energy consumption data being influenced by the at least one of the weather patterns. For example, a cold weather season may like cause a household to require additional heating (e.g., increased number of HDDs), thereby causing an increase in the billing amount during that cold weather season. The processor 236 may generate an indication of one or more units of time in the billing cycle of the utility bill that correspond to the correlation between the at least one of the weather patterns and the energy consumption data. In turn, the processor 236 may provide the generated indication of the weather correlation as insight data. In this respect, the insight data relating to the weather correlation may be stored as part of the billing insight data 254.

In certain aspects, the processor 236, using the weather engine 242, obtains first weather data corresponding to a first time period, and second weather data corresponding to a second time period, where the second time period is different than the first time period. The processor 236 may determine a first temperature from the first weather data and a second temperature from the second weather data. The processor 236 may compare the first temperature to the second temperature to determine a weather comparison between the first time period and the second time period. For example, the processor 236 may determine that a prior billing cycle was warmer than a current billing cycle by a measured number of degrees and that the measured number of degrees is greater than a threshold number of degrees. The processor 236 may then provide an indication of the weather comparison as insight data. In this respect, the insight data relating to the weather comparison may be stored as part of the billing insight data 254.

In certain aspects, the processor 236, using the disaggregation engine 248, disaggregates the energy consumption data (e.g., the raw energy usage data 256) to determine a number of cooling degree days and a number of heating degree days corresponding to a billing cycle of the utility bill. The number of cooling degree days and the number of heating degree days may be associated with the at least one of the one or more weather patterns. The processor 236 may determine cooling coefficients associated with the number of cooling degree days and corresponding usage data, and heating coefficients associated with the number of heating degree days and corresponding usage data, based on one or more characteristics of a property (e.g., square footage, geographic location, climate control elements, types of energy consumption loads, etc.) associated with the second user. The processor 236, using the billing advisor engine 250, may generate the energy consumption model using the cooling coefficients and the heating coefficients.

In some aspects, the disaggregation engine 248 receives a series of property energy usage values and corresponding outdoor temperature values. The disaggregation engine 248 may use the outdoor temperature values to determine a series of temperature difference values (e.g., cooling degree values) over a baseline temperature. The processor 236, using the disaggregation engine 248, may calculate a cooling coefficient by running a regression analysis on the property energy usage values and the temperature difference values. In one or more implementations, the property energy usage values may be plotted against the temperature difference values, and a least squares regression analysis may generate a line. The slope of that line may represent the cooling coefficient. Other regression methods may also be used (e.g., non-linear, piece-wise, etc.).

In certain aspects, the processor 236, using the disaggregation engine 248, disaggregates the energy consumption data into multiple energy consumption components, where each of the energy consumption components corresponds to a different type of energy demand associated with one or more components of a property. For example, the processor 236, using the disaggregation engine 248, performs disaggregation of HVAC energy usage based on heating coefficients and cooling coefficients. The processor 236, using the billing advisor engine 250, may provide a representation of energy consumption components for display within the interface. For example, the representation may be a pie-chart graph including portions that respectively correspond to the energy consumption components. The processor 236, using the rate engine 246, may map a rate value to each of the energy consumption components to determine respective utility costs. The processor 236, using the billing advisor engine 250, may provide a prioritized listing of the respective utility costs for display within the interface based on one or more interactions between the first user and the representation of the consumption components.

In certain aspects, the processor 236, using the billing advisor engine 250, receives first user input identifying one or more characteristics of a property associated with the second user. For example, the first user input may identify a home type (e.g., single family residence, apartment, condominium, or the like), identify whether the second user owns or rents the property, identify a size of the property (e.g., square footage), identify a number of occupants, and the like. The processor 236 may receive second user input identifying a type of climate control associated with the property. For example, the second user input may identify a heating type (e.g., air vents, radiating), identify a cooling type (e.g., central A/C, non-permanent air conditioner), identify a water heater type (e.g., gas, electric), and the like. The first user input also may include an indication of a lighting type (e.g., energy-efficient, incandescent, etc.), and an indication of whether the property includes a swimming pool that is heated. The second user input also may include an indication of a type of energy consumption load, such as an appliance (e.g., washer, dryer, dishwasher, refrigerator, electric vehicle, etc.). In some aspects, the first user input and the second user input is received in response to a query presented on the interface. The processor 236 may identify one or more setting changes to a setpoint schedule associated with the type of climate control. The processor 236 may determine a projected utility bill corresponding to a projected billing cycle, the projected utility bill identifying a difference in billing amount between the utility bill and the projected utility bill based on the one or more setting changes to the setpoint schedule. The processor 236 may then provide an indication of the projected utility bill for display within the user interface. In these aspects, the processor 236 may provide an indication of the one or more setting changes to the setpoint schedule for display within the interface based on one or more interactions between the first user and a representation of the projected utility bill provided for display on the interface.

In certain aspects, the processor 236, using the billing advisor engine 250, provides an interactive energy consumption histogram associated with a billing cycle of the inquired utility bill for display within the interface. The interactive energy consumption histogram may identify a distribution of energy consumption over multiple time units of the billing cycle (e.g., hours, days, weeks). The processor 236 may receive user input from the client 110 identifying a location on the displayed interactive energy consumption histogram, where the location may correspond to at least one of the multiple time units. The processor 236 may generate a preview window that includes an indication of insight data from the billing insight data 254 that corresponds to energy consumption during the identified time units. The processor 236 may then provide the preview window for display in an overlay at a position overlapping at least in part the location on the interactive energy consumption histogram. In these aspects, the user input may include a cursor position corresponding to the location on the interactive energy consumption histogram, where the cursor may be hovered over the location on the interactive energy consumption histogram to trigger the display of the preview window. In other aspects, the user input includes a touch input position corresponding to the location on the interactive energy consumption histogram, where the touch input is detected via the output device 214 of the client 110 for a predetermined duration of time to trigger the display of the preview window.

In certain aspects, the processor 236, using the billing advisor engine 250, receives a first user input identifying a request for a usage histogram corresponding to a billing cycle of the inquired utility bill, and receives a second user input identifying a request for a weather histogram corresponding to the billing cycle. The processor 236 may associate at least a portion of the weather histogram with the usage histogram. The processor 236 may determine a first mapping between the weather histogram and the utility bill, and a second mapping between the usage histogram and the utility bill, based on the association between the weather histogram and the usage histogram. The processor 236 may compare the first mapping to the second mapping, and may determine a first correlation between the utility bill and the usage histogram and/or a second correlation between the utility bill and the weather histogram, based on comparison results from the comparison. The first correlation may identify energy consumption as a primary source for the billing amount of the utility bill to exceed the cost expectation of the second user. In other aspects, the second correlation identifies weather as the primary source for the billing amount of the utility bill to exceed the cost expectation of the second user. The processor 236 may provide an indication of either correlation as insight data depending on implementation. In this respect, the insight data relating to the determined correlations may be stored as part of the billing insight data 254.

In these aspects, the processor 236, using the billing advisor engine 250, obtains historical energy consumption data associated with a property of the second user, where the historical energy consumption data may include energy consumption data corresponding to multiple billing cycles. In some implementations, each of the billing cycles may include weekly intervals (e.g., four billing weeks in a monthly cycle), where each of the weekly intervals include daily intervals (e.g., seven billing days in each week), where each of the daily intervals include hourly intervals (e.g., twenty-four billing hours in a day). The processor 236 may identify at least one of the hourly intervals as a highest hourly interval, where the highest hourly interval may correspond to a highest energy consumption among the hourly intervals for each of the daily intervals (e.g., highest hour of the day for energy consumption). The processor 236 may identify at least one of the daily intervals as a highest daily interval, where the highest daily interval may correspond to a highest energy consumption among the daily intervals for each of the weekly intervals (e.g., highest day of the week for energy consumption). The processor 236 may then provide an indication of the highest hourly interval and the highest daily interval as respective insights. In this respect, the insight data relating to the highest hourly interval and the highest daily interval may be stored as part of the billing insight data 254.

In these aspects, the processor 236, using the rate engine 246, applies a rate value to energy consumption data corresponding to at least the highest daily interval to determine a billing amount associated with the highest daily interval. The processor 236, using the billing advisor engine 250, may then provide the billing amount associated with the highest daily interval for display within the interface based on one or more interactions between the first user and the indication of the highest daily interval. In some aspects, the rate engine 246 obtains rate data and/or a rate schedule from one or more data sources and/or third-party service providers (e.g., the utility service provider). In other aspects, the rate engine 246 obtains multiple types of rate data and/or multiple types of rate schedules from the one or more data sources accessible to the server 130.

In these aspects, the processor 236, using the billing advisor engine 250, determines a type of billing inquiry from the second user based on a location of each of one or more interactions between the first user and the interface, where each of the locations correspond to respective portions of the inquired utility bill for identifying additional information associated with the billing insight data 254. For example, the processor 236 may measure the first user's movement throughout the interface to identify areas of the utility bill that the second user had a question about or areas on the interface that facilitated the first user's response to any billing inquiry from the second user.

Figure 3:
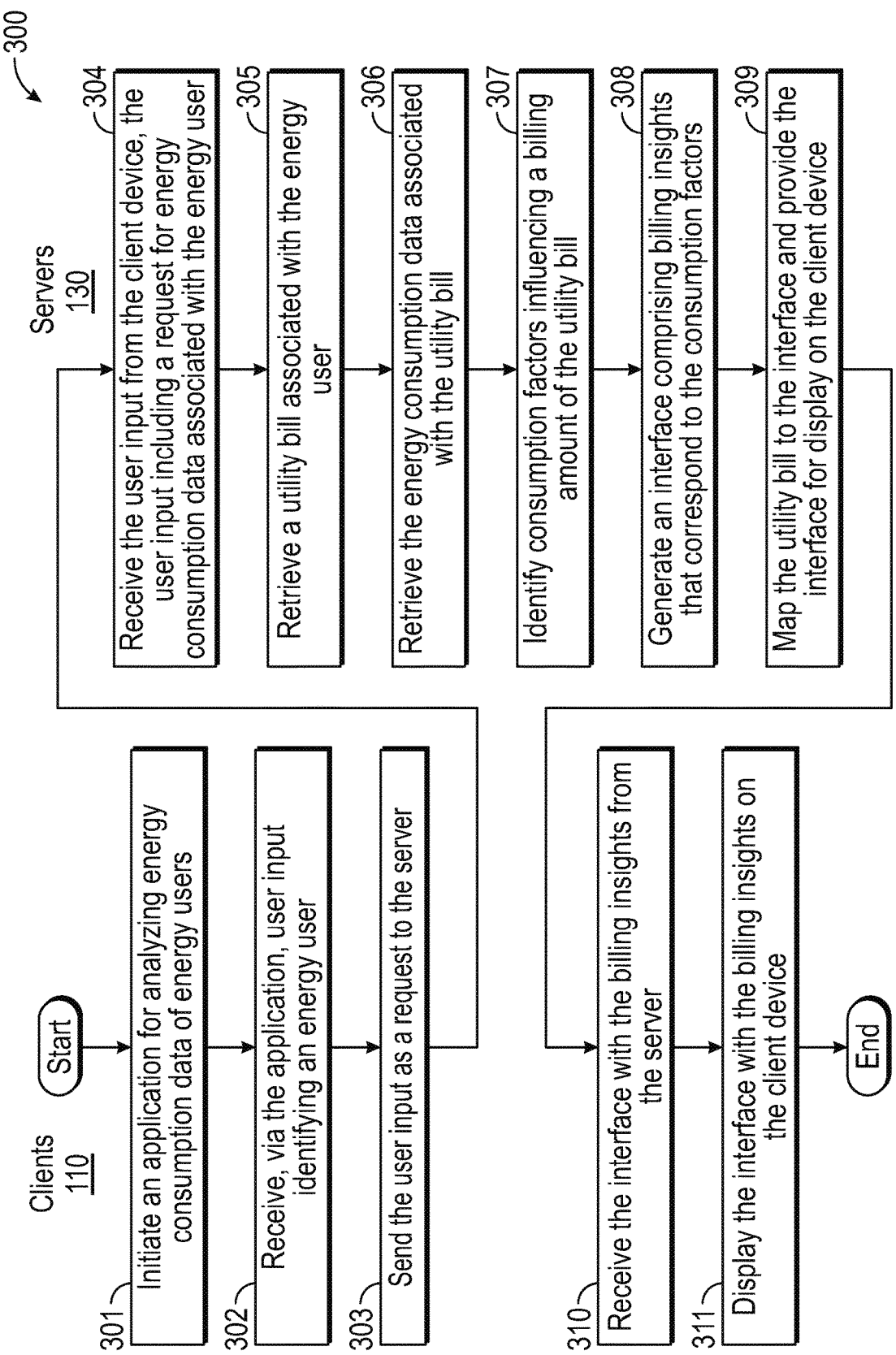
FIG. 3 illustrates an example process for analyzing energy usage data using the example client and server of FIG. 2.

FIG. 3 illustrates an example process 300 for analyzing energy usage data using the example client and server of FIG. 2. The process 300 begins in step 301 when a user, for example, loads (or initiates) an application 222 on the client 110 for analyzing energy consumption data of energy users. Next, in step 302, the application 222 on the client 110 receives an input from the user using the input device 216 for a search query for energy consumption data of a particular energy user. The user can utilize the input device 216 to submit an identification of the energy user or a selection of a user profile associated with the energy user as part of the search query via a user interface of the application 222. Next, in step 303, the application 222 on the client 110 sends the user input as a request to the server 130 in order to receive specific billing insights which are responsive to a utility billing inquiry from the energy user.

Turning to the server 130, in step 304, the server 130 receives the user input for the search query for energy consumption data of the energy user from the client 110. Subsequently, in step 305, the processor 236 of the server 130 retrieves a utility bill associated with the utility billing inquiry from the energy user. In step 306, the processor 236 of the server 130 also retrieves energy consumption data associated with the retrieved utility bill. Next, in step 306, the processor 236 identifies consumption factors that influence the billing amount of the utility bill. Subsequently, in step 307, the processor 236 generates an interface that includes a representation of the specific billing insights which correspond to the identified consumption factors. In step 309, the processor 236 maps the utility bill to the interface, and the server 130 provides the client 110 with the generated interface with the specific billing insights.

Turning to the client 110, in step 310, the client 110 receives the interface with the specific billing insights from the server 130. Next, in step 311, the interface with the specific billing insights is provided for display via the application 222 of the client 110.

Figure 4:
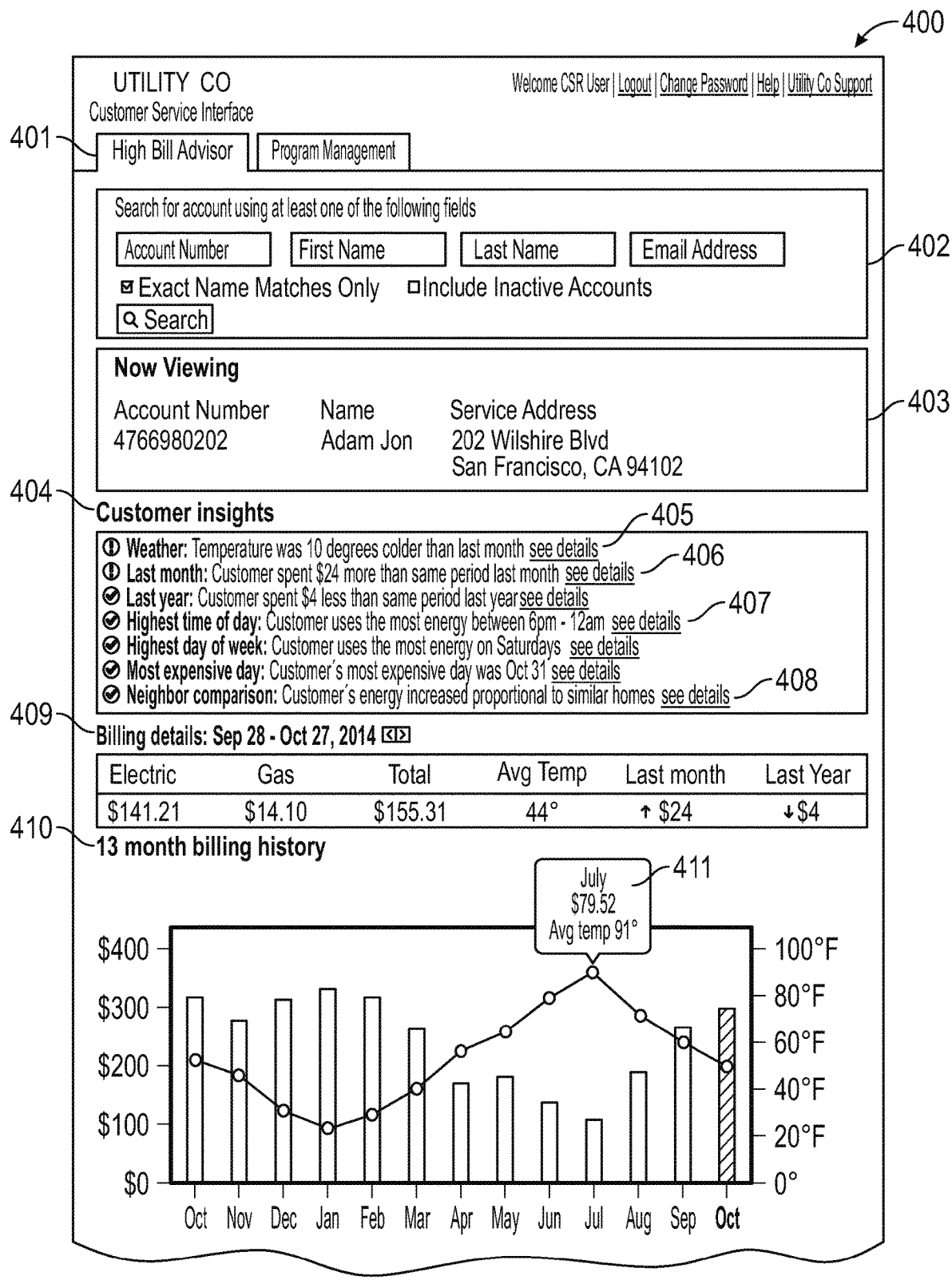
FIG. 4 illustrates an example of an interface with specific billing insights for practicing the example process of FIG. 3.

FIG. 4 illustrates an example of an interface 400 with specific billing insights for practicing the example process of FIG. 3. The interface 400 includes a page referring to a billing advisor tab 401 for analyzing an energy user's energy consumption in an inquired utility bill of that energy user. In FIG. 4, the billing advisor tab 401 identifies multiple sections, including but not limited to, an input section 402, an account summary 403, an insight data preview 404, a bill comparison preview 409, and an energy history preview 410. The page may be provided for display as a continuous landing page of the interface 400. In this respect, the user of the interface 400 (e.g., customer service representative) can review user-specific billing insights that the user can communicate to the energy user during a live (or real-time) interaction or other correspondence. The interface 400 is designed to facilitate the user in provider relevant insights in a fast and more compelling manner than current energy consumption auditing engines. The interface 400 layout increases efficiency in presenting the specific billing insights, as well as reduces costs associated with the customer service representative functions. For example, the interface 400 can facilitate the user in reducing high bill call average handle time (AHT) and increase high bill first-call resolution (FCR) by providing for display more poignant, and more personalized energy billing insights, on a faster and more consistent basis than the current energy consumption auditing engines.

The input section 402 allows for the user of the interface 400 to search for an energy user's utility bill and/or energy consumption data by supplying identification of the energy user. For example, the user can search for an energy user account using one or more fields, such as account number, first name of energy user, last name of energy user and/or email address associated with the energy user. The input section 402 is used to trigger a search query for energy consumption data of the energy user including billing insights relating to the inquired utility bill. In some aspects, the input section 402 includes an option to search by an exact match of the entered name, or by including inactive accounts (e.g., accounts no longer active with the utility service provider). The input section 402 may include a search control button to submit the input provided within the fields of the input section 402.

The account summary 403 identifies the energy user account being displayed to the user of the interface 400. The account summary 403 may provide information identifying the account number, the name of the energy user, and the service address associated with the energy user. In some aspects, the account summary 403 may include other related information used to identify the energy user account and/or the energy user.

The insight data preview 404 provides a listing of insight data for respective consumption factors that influence a billing amount of an inquired utility bill. In this embodiment, the insight data preview 404 provides insights based on weather, bill comparisons to a prior month cycle and a prior year corresponding to the billing cycle of the inquired utility bill, consumption peak points in a day and in a week, consumption cost peak corresponding to a day in the billing cycle, and neighbor comparisons. Insight data 405 identifies a weather comparison between the billing cycle of the inquired utility bill to a billing cycle of a previous month to show a temperature difference (e.g., ten degrees cooler than the previous month) is a likely factor in an increase of the billing amount in the inquired utility bill. Insight data 406 identifies that the billing amount increased compared to the previous billing cycle, as well as identifying that the billing amount decreased compared to a corresponding cycle of the previous year. Insight data 407 identifies which time of the day used the most energy, as well as which day of the week used the most energy as explanations for the increase in the billing amount. Insight data 408 identifies that the energy user's consumption increased proportionately compared to energy users of similar homes. In one or more embodiments, each of the insight data of the insight data preview 404 includes an accompanying link, which when selected by the user, initiates retrieval of additional insight information using the data browser engine 252 and provided for display on a different landing page (not shown) of the interface 400.

The bill comparison preview 409 shows a graphical representation of a table listing billing details including a billing comparison to one or more prior billing cycles. In this embodiment, the billing details include information relating to a disaggregation of the inquired utility bill. For example, the bill comparison preview 409 includes a billing amount for the amount of electricity consumed and a separate billing amount for the amount of gas consumed, as well as a total amount of the disaggregated billing amounts. The billing details also include weather information such as an indication of the average temperature during the billing cycle. The billing comparison includes icons identifying an increase or decrease in the billing amount compared to the prior billing cycles. In some aspects, the bill comparison preview 409 includes an option to select a different billing cycle, which causes the bill comparison to update based on the selected billing cycle.

The energy history preview 410 shows a two-dimensional chart identifying a histogram of energy consumption over time. The first axis (e.g., y-axis) identifies the billing amount, and the second axis (e.g., x-axis) identifies an observed billing period (e.g., months within the observed billing period). In some aspects, the energy history preview 410 includes a weather histogram superimposed with the energy histogram to identify a correlation between weather patterns and the energy consumption. For example, in the month of January, the weather pattern indicates a lowest cold temperature in the observed billing period, which corresponds to a highest consumption amount in the observed billing period. In this respect, the increase in energy consumption for the month of January required additional heating which is likely caused by the coldest average temperature during that month. The energy history preview 410 also includes an insight preview window 411 that is provided for display based on one or more interactions between the user and the interface 400. For example, the user may hover a cursor over a location on the energy histogram (e.g., over the month of July) to trigger a display of insight information pertaining to that month on the histogram. The insight preview window 411 may display information identifying the month, the billing amount for that month, and the average temperature for that month. The insight preview window 411 may be provided for display in an overlay at a position that overlaps a location on the energy histogram, or at a position adjacent to the selected data point of the energy histogram.

FIG. 5 illustrates an example of an additional section of the interface 500 with specific billing insights of FIG. 4. In FIG. 5, the interface 500 also identifies multiple sections, including but not limited to, a home energy analysis interface 412, an energy tips interface 414 and a customer communication interface 415. The home energy analysis interface 412 allows for the user to disaggregate the energy consumption data by identifying different types of energy (or commodity) as well as different types of loads for a corresponding commodity. The interface 400 may provide for display an integrated prompt that queries the user for information relating to characteristics of the energy user's property. For example, the interface 400 may query for the home type, whether the energy user owns or rents, the size of the property, number of occupants in the property, heating type, cooling type, water heater type, lighting type, swimming pool heating option, and identification of specific appliances in the property. The home diagnosis that results from the input query to the home energy analysis interface 412 is a graphical representation of the billing amount and a breakdown of the energy sources that contribute to the energy consumption (e.g., 413).

The energy tips interface 414 provides the user with information relating to methods of adjusting climate control devices and/or the rate of energy consumption. For example, the interface 400 may prompt the user to select one of multiple types of energy consumption loads (e.g., heating, cooling, hot water, lighting, appliances) to trigger a display of energy saving tips for that selected energy consumption load. In some aspects, the interface 400 prompts the user to select a season (e.g., summer, winter) which may alter the cooling and heating coefficients as part of the projected energy consumption calculations. For example, the user may select cooling as the type of energy consumption load of which the energy tips interface 414 provides for display a graphic with an accompanying recommendation to adjust thermostat settings by a few degrees to decrease the amount of cooling and heating needed, thereby projecting a decrease in the corresponding billing amounts.

The customer communication interface 415 allows the user to trigger a follow-up communication to the energy user. The follow-up communication may be sent to the energy user following a live interaction regarding a utility bill inquiry. The customer communication interface 415 provides one or more options to select communications that subscribe the energy user to receive scheduled energy usage alert notifications, notifications relating to periodic meter readings, and/or notification of utility bill generation (or delivery). In some aspects, the customer communication interface 415 enables the user to submit user information of the energy user such as an email address of the energy user as part of the subscription process (e.g., 416). In some embodiments, the interface 400 prompts the user to select an option relating to the outcome of the live interaction with the energy user. For example, the prompt may query whether the live interaction was successful or not. In some aspects, the user selection of one of the options relating to the outcome of the live interaction with the energy user may trigger the follow-up communication to be initiated automatically or provide for display a separate landing page relating to the follow-up communication setup (not shown).

Figure 6:
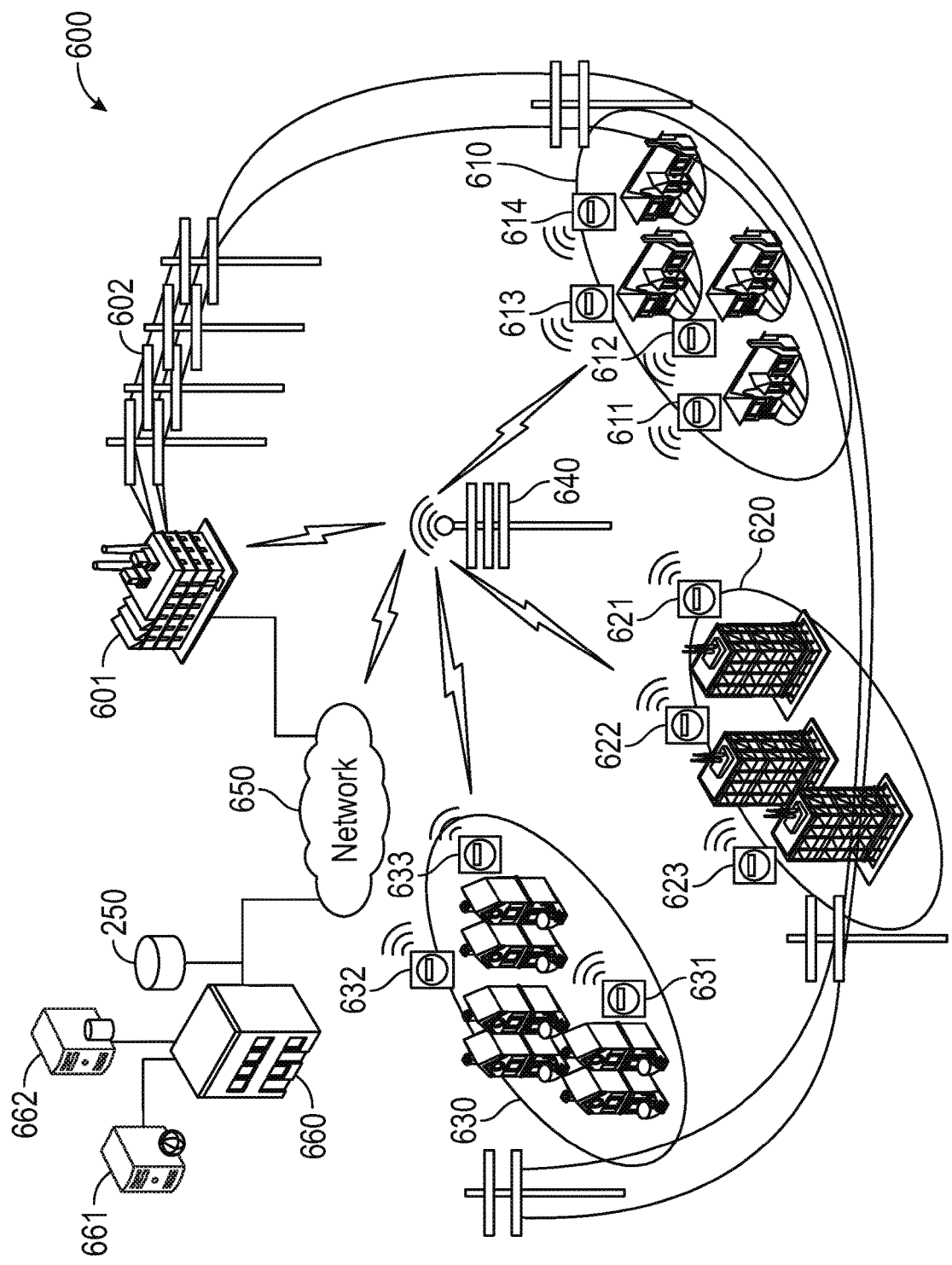
FIG. 6 illustrates an example of an environment for implementing aspects in accordance with various embodiments.

FIG. 6 illustrates an example of an environment 600 for implementing aspects in accordance with various embodiments. The environment 600 includes a utility service provider 601, power distribution system 602, energy user regions 610, 620 and 630, energy usage collector 640, a network 650 and an energy consumption analytics system 660. In one or more embodiments, the server 130 of FIG. 2 is, or is at least a subset of, the energy consumption analytics system 660. The energy user region 610 includes residential structures with corresponding smart meters 611-614. The energy user region 620 includes commercial structures with corresponding smart meters 621-623. The energy user region 630 includes residential multi-family structures with corresponding smart meters 631-633. The energy consumption analytics system 660 includes a web server 661, an application server 662 and a database 663. In one or more embodiments, the database 663 is, or is at least a subset of, the memory 232 of FIG. 2.

The utility service provider 601 provides a commodity (e.g., electricity, gas, water) to the energy user regions 610, 620 and 630. The utility service provider 601 may measure the energy usage from each region via a sensor device (e.g., a smart meter) associated with each structure of the corresponding region. The utility service provider 601 may receive usage data that includes the amount of energy consumption (e.g., kilowatt hour) for a corresponding utility account. In some aspects, the utility service provider 601 receives the usage data from each sensor device through a wired communication system. In other aspects, the utility service provider 601 receives the usage data from the energy usage collector 640 via the network 150 or a wireless communication system. For example, the energy usage collector 640 may obtain the usage data directly by pulling the usage data from each of the smart meter devices. The smart meter devices may broadcast usage data on a scheduled or non-scheduled basis.

The energy consumption analytics system 660 is in communication with the utility service provider 601 via the network 650. In some aspects, the energy consumption analytics system 660 obtains raw energy usage data (e.g., the raw energy usage data 256) from the utility service provider 601 via the network 650. In other aspects, the energy consumption analytics system 660 obtains the raw energy usage data from the energy usage collector 640 via the network 650. In these aspects, the energy consumption analytics system 660 may receive the usage data directly from the smart meter devices.

Each of the energy user regions 610, 620 and 630 may correspond to a separate geographical location with a respective rate schedule. In some aspects, a billing analysis with insight data for a corresponding energy user in one region may be generated using energy usage data of similar users in the same region to provide the corresponding energy user with a comparative analysis of its energy consumption (e.g., current energy usage compared to similar customers in the same zip code or within a certain radius).

The usage data for an energy user may be obtained from a corresponding sensor device on a scheduled basis, periodic basis or a non-scheduled basis. The sensor devices (e.g., smart meters 611-614) may relate to an advanced metering infrastructure (AMI) technology. In this respect, the smart meters, at least in part, include smart meter functionality for measuring electrical, water and/or natural gas consumption in the property associated with the corresponding energy user. For example, the usage data may consist of usage information corresponding to the property in its entirety such that usage information relating to one or more components in the property is disaggregated by the energy consumption analytics system 660.

The energy consumption analytics system 660 also may be in communication with a third party weather service, such as the National Weather Service (not shown). For example, the energy consumption analytics system 660 may receive corresponding outdoor temperatures from the third party weather service via the network 650 (e.g., e-mails, downloaded FTP files, and XML feeds). In this respect, the energy consumption analytics system 660 may use weather data from the third party weather service to determine a projected billing amount for a particular billing period, and identify any changes in the projected billing amount relative to a previous billing cycle due to weather patterns identified in the weather data. For example, forecasted weather conditions (e.g., the temperature, the humidity, the barometric pressure, precipitation, etc.) may indicate that an energy user's HVAC system is likely to be in greater use, thereby likely to cause an increase in the energy user's energy load curve. The energy consumption analytics system 660 may notify the energy user of insight information relating to a billing amount of an inquired utility bill through a follow-up communication (or an energy usage alert notification).

The energy consumption analytics system 660 may communicate the follow-up communication to energy users associated with the energy user regions 610, 620 and 630. In some aspects, the energy consumption analytics system 660 communicates the follow-up communication via the network 650. For example, the energy consumption analytics system 660 may send the follow-up communication as an e-mail to the energy user, or the energy user may log into an endpoint associated with the energy consumption analytics system 660 (e.g., the web server 661 and/or application server 662) through an associated website to view additional insight information and/or promotional content relating to an inquiry of a billing amount for a given utility bill of the energy user. The energy consumption analytics system 660 may provide the insight information to a printing system so that the follow-up communication can be provided to the energy user via regular mail (e.g., as part of a utility bill). In other embodiments, the insight information is communicated from the energy consumption analytics system 660 to the utility service provider 601 so that the utility service provider 601 can provide the follow-up communication directly to the energy user.

Figure 7:
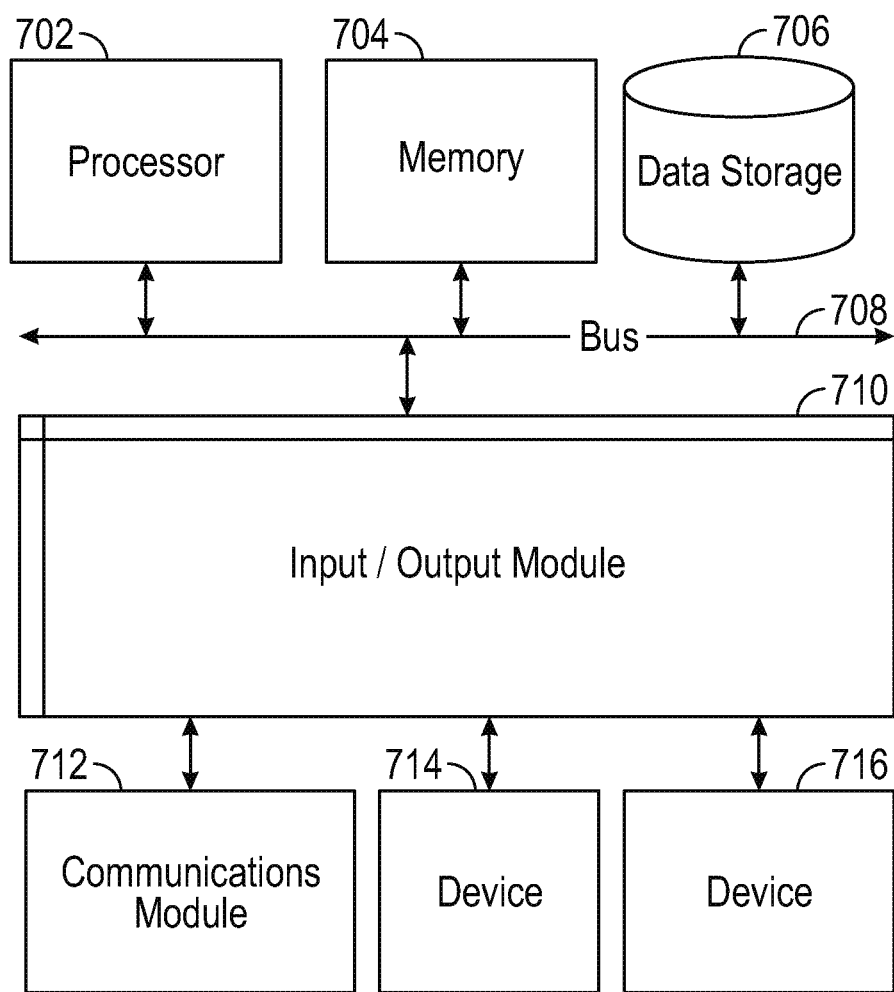
FIG. 7 is a block diagram illustrating an example computer system with which the client and server of FIG. 2 can be implemented.

FIG. 7 is a block diagram illustrating an exemplary computer system 700 with which the client 110 and server 130 of FIG. 1 can be implemented. In certain aspects, the computer system 700 may be implemented using hardware or a combination of software and hardware, either in a dedicated server, or integrated into another entity, or distributed across multiple entities.

Computer system 700 (e.g., client 110 and server 130) includes a bus 708 or other communication mechanism for communicating information, and a processor 702 (e.g., processor 212 and 236) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 (e.g., communications modules 218 and 238) include networking interface cards, such as Ethernet cards and modems. In certain aspects, the input/output module 710 is configured to connect to a plurality of devices, such as an input device 714 (e.g., input device 216) and/or an output device 716 (e.g., output device 214). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as a LCD (liquid crystal display) monitor, for displaying information to the user.

According to one aspect of the present disclosure, the client 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the images in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method performed by a computing device where the computing device includes at least a processor for executing instructions from a memory for generating an energy consumption usage recommendation tool for a utility service provider user, comprising:

generating the energy consumption usage recommendation tool comprising a graphical user interface for a utility service provider user, and displaying the graphical user interface on a display screen;

in response to an interaction by a first user with the graphical user interface associated with the energy consumption usage recommendation tool for the utility service provider user, wherein the energy consumption usage recommendation tool is associated with a computer application running on a computing device comprising a processor for executing instructions from the memory, receiving, by the processor, user input, via the graphical user interface, from the first user associated with a utility service provider of a second user, wherein the user input identifies a request for energy consumption data of the second user, wherein the energy consumption data identifies one or more energy usage patterns associated with the second user;

retrieving, by the processor, an authentication security token of the second user from the second user;

in response to retrieving the authentication security token of the second user, providing, by the processor, the authentication security token of the second user to the utility service provider;

in response to acceptance of the authentication security token of the second user by the utility service provider, retrieving, by the processor, a utility bill associated with the second user from the utility service provider using the authentication security token of the second user;

retrieving, by the processor, the energy consumption data associated with the utility bill associated with the second user from one or more distributed computing devices using the authentication security token of the second user;

identifying, by the processor, one or more energy consumption factors associated with the second user influencing a billing amount of the utility bill associated with the second user based on the energy consumption data associated with the second user;

generating, by the processor, on the graphical user interface a plurality of insights that correspond to the one or more energy consumption factors associated with the second user, wherein the plurality of insights identify one or more explanations as to why the billing amount of the utility bill associated with the second user exceeded a cost expectation of the second user;

mapping, by the processor, at least a portion of the utility bill to the graphical user interface;

providing, by the processor, on the graphical user interface a display to the first user, wherein the plurality of insights being displayed are based on one or more interactions between the first user and the graphical user interface;

providing, by the processor, the plurality of insights to the second user; and in response to an interaction between the first user and the second user based upon the presentation of the plurality of insights to the second user, providing, by the processor, a follow-up communication to a computing device of the second user, wherein the second user can select an option relating to an outcome of the interaction between the first user and the second user.

2. The computer-implemented method of claim 1, further comprising:

identifying, by the processor, first usage data and second usage data from the retrieved energy consumption associated with the second user, the first usage data corresponding to a first billing cycle associated with the second user and the second usage data corresponding to a second billing cycle associated with the second user;

comparing, by the processor, the first usage data associated with the second user to the second usage data associated with the second user;

identifying, by the processor, a usage difference between the first usage data associated with the second user and the second usage data associated with the second user based on comparison results from the comparison; and providing, by the processor, via the graphical user interface to the first user an indication of the usage difference as one of the plurality of insights for display within the graphical user.

3. The computer-implemented method of claim 1, further comprising:
retrieving, by the processor, energy consumption data associated with other users associated with the utility service provider of similar characteristics to the second user;
obtaining, by the processor, first usage data associated with the second user from the energy consumption data associated with the second user;
obtaining, by the processor, second usage data associated with the other users from the energy consumption data associated with the other users, wherein the first usage data associated with the second user and the second usage data associated with the other users corresponds to a same time period;
determining, by the processor, a first usage trend from the first usage data associated with the second user and a second usage trend from the second usage data associated with the other users, wherein the first usage trend associated with the second user and the second usage trend associated with the other users are determined using two or more billing cycles associated with the second user and associated with the other users of the same time period;
comparing, by the processor, the first usage trend associated with the second user to the second usage trend associated with the other users;
identifying, by the processor, a trend difference between the first usage trend associated with the second user and the second usage trend associated with the other users based on comparison results from the comparison, wherein the trend difference identifies an increase or decrease in energy consumption by the second user relative to the other users over the two or more billing cycles associated with the second user and associated with the other users; and
providing, by the processor, via the graphical user interface to the first user, an indication of the trend difference as one of the plurality of insights for display within the graphical user.

4. The computer-implemented method of claim 1, further comprising:
processing, by the processor, the energy consumption data associated with the second user using at least one of the plurality of insights;
determining, by the processor, one or more proposed changes to the energy consumption data associated with the second user for a projected billing cycle associated with the second user, wherein the one or more proposed changes corresponds to a decreasing rate of energy consumption for a property associated with the second user;
generating, by the processor, a notification identifying a recommendation to the second user on how to adopt the one or more proposed changes; and
providing, by the processor, via the graphical user interface to the first user, the generated notification to the first user for subsequent transmittal to the second user for display within the graphical user interface.

5. The computer-implemented method of claim 1, further comprising:
identifying, by the processor, a first rate value associated with the energy consumption data associated with the second user;
identifying, by the processor, a second rate value, wherein the second rate value is different than the first rate value, wherein the second rate value being proposed to the second user is proposed to the second user based according to;
determining a first billing amount in the utility bill of the second user based upon the first rate value;
determining a second billing amount in the utility bill of the second user based upon the second rate value;
comparing, by the processor, the first rate value to the second rate value;
identifying, by the processor, a rate difference between the first rate value and the second rate value based on comparison results from the comparison, wherein the rate difference corresponds to a billing amount difference between the first rate value and the second rate value of the second user; and
providing, by the processor, via the graphical user interface to the first user, an indication of the rate difference as one of the plurality of insights for display within the graphical user interface.

6. The computer-implemented method of claim 1, further comprising:
obtaining, by the processor, weather data from a weather service provider;
identifying, by the processor, one or more weather patterns from the weather data, wherein each of the one or more weather patterns corresponds to a different calendar cycle;
generating, by the processor, an energy consumption model of the second user based on at least one of the one or more weather patterns corresponding to a billing cycle of the utility bill associated with the second user;
applying, by the processor, the energy consumption model of the second user to the energy consumption data associated with the second user;
determining, by the processor, a correlation between the energy consumption model of the second user and the energy consumption data associated with the second user, wherein the correlation identifying at least a portion of the energy consumption data associated with the second user is influenced by the at least one of the weather patterns;
generating, by the processor, an indication of one or more units of time in the billing cycle of the utility bill associated with the second user corresponding to the correlation between the at least one of the weather patterns and the energy consumption data associated with the second user; and
providing, by the processor, via the graphical user interface to the first user, the generated indication as one of the plurality of insights for display within the graphical user interface.

7. The computer-implemented method of claim 6, further comprising:
disaggregating, by the processor, the energy consumption data associated with the second user to determine a number of cooling degree days and a number of heating degree days corresponding to a billing cycle of the utility bill associated with the second user, wherein the number of cooling degree days and the number of heating degree days are associated with the at least one of the one or more weather patterns; and
determining, by the processor, cooling coefficients associated with the number of cooling degree days, and heating coefficients associated with the heating degree days based on one or more characteristics of a property associated with the second user, wherein the energy consumption model of the second user is generated using the cooling coefficients and the heating coefficients.

8. The computer-implemented method of claim 1, further comprising:
   receiving, by the processor, a first user input identifying one or more characteristics of a property associated with the second user;
   receiving, by the processor, a second user input identifying a type of climate control associated with the property associated with the second user;
   identifying, by the processor, one or more setting changes to a setpoint schedule associated with the type of climate control associated with the property associated with the second user;
   determining, by the processor, a projected utility bill associated with the second user corresponding to a projected billing cycle associated with the second user, wherein the projected utility bill associated with the second user identifies a difference in billing amount between the utility bill associated with the second user and the projected utility bill associated with the second user based on the one or more setting changes to the setpoint schedule; and
   providing, by the processor, via the graphical user interface to the first user, an indication of the projected utility bill associated with the second user for display within the graphical user interface.

9. The computer-implemented method of claim 8, further comprising:
   providing, by the processor, via the graphical user interface to the first user, an indication of the one or more setting changes to the setpoint schedule for display within the interface based on one or more interactions between the first user and a representation of the projected utility bill associated with the second user.

10. The computer-implemented method of claim 1, further comprising:
    providing, by the processor, via the graphical user interface to the first user, an interactive energy consumption histogram associated with a billing cycle of the utility bill associated with the second user for display within the interface, wherein the interactive energy consumption histogram identifies a distribution of energy consumption over a plurality of time units of the billing cycle associated with the second user;
    receiving, by the processor, a first user input from the first user identifying a location on the interactive energy consumption histogram, wherein the location corresponds to at least one of the plurality of time units;
    generating, by the processor, a preview window that includes an indication of at least one of the plurality of insights corresponding to energy consumption associated with the second user on the at least one of the plurality of time units; and
    providing, by the processor, via the graphical user interface to the first user, the preview window for displaying in an overlay at a position overlapping, at least in part, the location on the interactive energy consumption histogram for display within the graphical user.

11. The computer-implemented method of claim 10, wherein the first user input includes a cursor corresponding to the location on the interactive energy consumption histogram, wherein the cursor is hovered over the location on the interactive energy consumption histogram to trigger the display of the preview window.

12. The computer-implemented method of claim 10, wherein the first user input includes a touch input by the first user corresponding to the location on the interactive energy consumption histogram, wherein the first user touch input is detected on a display unit for a predetermined duration of time to trigger the display of the preview window.

13. The computer-implemented method of claim 1, further comprising:
    receiving, by the processor, a first user input identifying a request for a usage histogram corresponding associated with the second user to a billing cycle of the utility bill associated with the second user;
    receiving, by the processor, a second user input identifying a request for a weather histogram associated with the second user corresponding to the billing cycle associated with the second user;
    associating, by the processor, at least a portion of the weather histogram associated with the second user with the usage histogram associated with the second user;
    determining, by the processor, a first mapping between the weather histogram associated with the second user and the utility bill associated with the second user, and a second mapping between the usage histogram associated with the second user and the utility bill associated with the second user based on the association between the weather histogram associated with the second user and the usage histogram associated with the second user;
    comparing, by the processor, the first mapping to the second mapping;
    determining, by the processor, a correlation between the utility bill associated with the second user and one of the usage histogram associated with the second user or the weather histogram associated with the second user based on comparison results from the comparison, wherein the correlation identifies energy consumption or weather as a primary source for the billing amount of the utility bill associated with the second user to exceed the cost expectation of the second user; and
    providing, by the processor, via the graphical user interface to the first user, an indication of the correlation as one of the plurality of insights for display within the graphical user.

14. The computer-implemented method of claim 1, further comprising:
    disaggregating, by the processor, the energy consumption data associated with the second user into a plurality of energy consumption components, wherein each of the plurality of energy consumption components corresponds to a different type of energy demand associated with one or more components of a property associated with the second user, wherein each of the plurality of energy consumption components includes one or more of a central heating device, a central air conditioning and heating system, an appliance, an electronic device, a water heating system, a power generating device, a ventilation system, or an air filtration system;
    providing, by the processor, via the graphical user interface to the first user, a representation of the plurality of energy consumption components for display within the interface;
    mapping, by the processor, a rate value to each of the plurality of energy consumption components to determine respective utility costs associated with each of the plurality of energy consumption components; and
    providing, by the processor, via the graphical user interface to the first user, a prioritized listing of the respective utility costs for display within the interface, wherein the prioritized listing of the respective utility costs are based on one or more interactions between the first user and the representation of the plurality of energy consumption components associated with the second user.

15. The computer-implemented method of claim 1, further comprising:
obtaining, by the processor, first weather data corresponding to a first time period associated with the second user, and second weather data corresponding to a second time period associated with the second user, wherein the second time period is different than the first time period;
determining, by the processor, a first temperature from the first weather data associated with the second user and a second temperature from the second weather data associated with the second user;
comparing, by the processor, the first temperature to the second temperature to determine a weather comparison between the first time period associated with the second user and the second time period associated with the second user; and
providing, by the processor, via the graphical user interface to the first user, an indication of the weather comparison as one of the plurality of insights for display within the graphical user.

16. The computer-implemented method of claim 1, further comprising:
obtaining, by the processor, historical energy consumption data associated with a property of the second user, the historical energy consumption data comprising energy consumption data corresponding to a plurality of billing cycles associated with the second user, each of the plurality of billing cycles including a plurality of weekly intervals, each of the plurality of weekly intervals including a plurality of daily intervals, each of the plurality of daily intervals including a plurality of hourly intervals;
identifying, by the processor, at least one of the plurality of hourly intervals as a highest hourly interval, the highest hourly interval corresponding to a highest energy consumption associated with the second user among the plurality of hourly intervals for each of the plurality of daily intervals;
identifying, by the processor, at least one of the plurality of daily intervals as a highest daily interval, the highest daily interval corresponding to a highest energy consumption among the plurality of daily intervals for each of the plurality of weekly intervals; and
providing, by the processor, via the graphical user interface to the first user, an indication of the highest hourly interval and the highest daily interval as respective insights of the plurality of insights.

17. The computer-implemented method of claim 16, further comprising: presenting, by the processor, the plurality of insights to the second user, wherein the plurality of insights include at least the historical energy consumption data associated with a property of the second user, the indication of the highest hourly interval and the highest daily interval, and the billing amount associated with the second user and associated with the highest daily interval based on one or more interactions between the first user and the indication of the highest daily interval associated with the second user, via a display on a graphical user interface associated with the second user.

18. The computer-implemented method of claim 1, further comprising:
determining, by the processor, a type of inquiry the second user may make based on one or more interactions between the first user and the graphical user interface, wherein each of the locations corresponds to respective portions of the utility bill associated with the second user which are of interest to the second user for identifying additional information to be presented to the second user associated with the plurality of insights.

19. A system for providing an energy consumption usage recommendation tool for a utility service provider customer comprising:
one or more processors;
a computer-readable storage medium coupled to the one or more processors, the computer-readable storage medium including instructions that, when executed by the one or more processors, cause the one or more processors to:
in response to a first user interaction with a graphical user interface associated with an energy consumption usage recommendation tool for a utility service provider customer, wherein the energy consumption usage recommendation tool is associated with the computer application running on a computing device comprising the one or more processors for executing instructions from a computer readable storage medium, receiving user input from a first user associated with a utility service provider of a second user, the user input identifying a request for energy consumption data of the second user, wherein the energy consumption data identifies one or more energy usage patterns associated with the second user;
retrieving a security token from the second user as an authentication of the second user from the second user;
in response to retrieving the security token from the second user, providing the security token of the second user to the utility service provider;
in response to acceptance of the security token of the second user by the utility service provider, provide on the graphical user interface a display of a plurality of portions of a utility bill associated with the second user from the utility service provider associated with the second user, wherein the graphical user interface is provided for display on a client device associated with a first user, wherein the first user is associated with the utility service provider;
receive user input from the first user, wherein the user input identifies the energy consumption data of the second user which further identifies an amount of energy consumption of a property associated with the second user over a predetermined billing cycle associated with the second user;
identify a billing amount of the energy consumption data of the second user in the predetermined billing cycle associated with the second user;
identify one or more energy consumption factors associated with the second user which influence the billing amount of the utility bill associated with the second user based on the energy consumption data of the second user;
generate on the graphical user interface insight information that corresponds to the one or more energy consumption factors associated with the second user, wherein the insight information identifies one or more explanations as to why the billing amount of the utility bill associated with the second user exceeded a cost expectation of the second user;

map at least a portion of the utility bill associated with the second user to the graphical user interface;

provide, via the graphical user interface to the first user, the insight information associated with the second user based on one or more interactions between the first user and the graphical user interface for display within the graphical user;

provide, by the processor, the plurality of insights to the second user; and in response to an interaction between the first user and the second user based upon the presentation of the plurality of insights to the second user, provide, by the processor, a follow-up communication to the second user, wherein the second user can select an option relating to an outcome of the interaction between the first user and the second user.

20. A non-transitory computer readable storage medium coupled to a processor, the non-transitory computer readable storage medium including instructions that, when executed by the processor, cause the processor to implement a method for providing an energy consumption usage recommendation tool for a utility service provider customer:

in response to a first user interaction with a graphical user interface associated with an energy consumption usage recommendation tool for a utility service provider customer, wherein the energy consumption usage recommendation tool is associated with a computer application running on a computing device comprising a processor for executing instructions from a computer readable storage medium, receive user input from a first user associated with a utility service provider of a second user, wherein the user input identifies a request for energy consumption data associated with a second user, wherein the energy consumption data identifies an amount of energy consumption of a property associated with the second user;

retrieve an authentication security token of the second user from the second user;

authenticate the second user by the utility service provider by using the authentication security token from the second user, wherein the authentication security token is provided to the utility service provider on a client device associated with the first user;

identify a session identifier associated with the authentication of the second user, wherein the session identifier comprises an indication of the second user being authenticated;

retrieve a utility bill associated with the second user based on the session identifier;

retrieve the energy consumption data of the second user associated with the utility bill of the second user from one or more distributed computing devices using the authentication security token;

identify one or more energy consumption factors associated with the second user, wherein the one or more energy consumption factors influence a billing amount of the utility bill associated with the second user based on the energy consumption data of the second user;

generate on the graphical user interface insight information that corresponds to the one or more energy consumption factors associated with the second user, wherein the insight information identifies one or more explanations as to why the billing amount of the utility bill associated with the second user exceeded a cost expectation of the second user;

map at least a portion of the utility bill associated with the second user to the graphical user interface;

provide, via the graphical user interface to the first user, the insight information associated with the second user based on one or more interactions between the first user and the graphical user interface for display within the graphical user interface;

provide, by the processor, the plurality of insights to the second user; and in response to an interaction between the first user and the second user based upon the presentation of the plurality of insights to the second user, provide, by the processor, a follow-up communication to the second user, wherein the second user can select an option relating to an outcome of the interaction between the first user and the second user.

* * * * *